United States Patent
Milam et al.

(10) Patent No.: US 8,834,707 B2
(45) Date of Patent: *Sep. 16, 2014

(54) PROCESS FOR TREATING A HYDROCARBON-CONTAINING FEED

(75) Inventors: Stanley Nemec Milam, Houston, TX (US); Michael Anthony Reynolds, Katy, TX (US); Scott Lee Wellington, Bellaire, TX (US); Frederik Arnold Buhrman, Santa Rosa (PH)

(73) Assignee: Shell Oil Company, Houston, TX (US)

( * ) Notice: Subject to any disclaimer, the term of this patent is extended or adjusted under 35 U.S.C. 154(b) by 353 days.

This patent is subject to a terminal disclaimer.

(21) Appl. No.: 13/314,781

(22) Filed: Dec. 8, 2011

(65) Prior Publication Data

US 2012/0145595 A1 Jun. 14, 2012

Related U.S. Application Data

(60) Provisional application No. 61/421,844, filed on Dec. 10, 2010.

(51) Int. Cl.
*C10G 65/12* (2006.01)
*C10G 47/06* (2006.01)
*C10G 47/26* (2006.01)
*B01J 27/043* (2006.01)

(52) U.S. Cl.
CPC .............. *C10G 65/12* (2013.01); *B01J 27/043* (2013.01); *C10G 2300/4012* (2013.01); *C10G 2300/301* (2013.01); *C10G 2300/202* (2013.01); *C10G 47/06* (2013.01); *C10G 2300/4006* (2013.01); *C10G 47/26* (2013.01); *C10G 2400/30* (2013.01); *C10G 2300/207* (2013.01)
USPC ............. 208/112; 208/97; 208/108; 208/211; 208/216 R; 208/217

(58) Field of Classification Search
CPC ........ C10G 65/02; C10G 65/04; C10G 65/12; C10G 45/06; C10G 47/06
USPC .......... 208/59, 97, 108, 112, 211, 216 R, 217
See application file for complete search history.

(56) References Cited

U.S. PATENT DOCUMENTS 2,159,511 A 5/1939 Mathias et al.
4,439,310 A * 3/1984 Audeh et al. ............. 208/111.15

(Continued)

FOREIGN PATENT DOCUMENTS

EP 0133031 A1 2/1985
EP 0145105 A2 6/1985

(Continued)

OTHER PUBLICATIONS

PCT International Search Report, Application No. PCT/US2011/063881 dated Jan. 22, 2013.

*Primary Examiner* — Renee E Robinson

(57) ABSTRACT

A process for treating a hydrocarbon-containing feedstock is provided in which a hydrocarbon-containing feedstock comprising at least 20 wt. % of heavy hydrocarbons is mixed with hydrogen, hydrogen sulfide and a metal-containing catalyst at a temperature of 375° C. to 500° C. and a pressure of from 6.9 MPa to 27.5 MPa to produce a vapor comprising a first hydrocarbon-containing product, where the hydrogen sulfide is mixed with the feedstock, metal-containing catalyst, and hydrogen at a mole ratio of hydrogen sulfide to hydrogen of at least 1:10. The vapor comprising the first hydrocarbon-containing product is separated from the mixture, and, apart from the mixture, the first hydrocarbon-containing product is contacted with hydrogen and a catalyst containing a Column 6 metal at a temperature of 260° C.-425° C. and a pressure of from 3.4 MPa to 27.5 MPa to produce a second hydrocarbon-containing product.

14 Claims, 1 Drawing Sheet

(56) References Cited

U.S. PATENT DOCUMENTS

| | | | |
|---|---|---|---|
| 4,740,294 A * | 4/1988 | Rhodes | 208/413 |
| 4,795,731 A | 1/1989 | Pecoraro et al. | |
| 4,820,677 A | 4/1989 | Jacobson et al. | |
| 7,435,335 B1 * | 10/2008 | Ellis et al. | 208/210 |
| 2005/0155906 A1 * | 7/2005 | Wellington et al. | 208/14 |
| 2009/0011931 A1 | 1/2009 | Chen et al. | |
| 2009/0023965 A1 | 1/2009 | Pereira et al. | |

FOREIGN PATENT DOCUMENTS

| | | |
|---|---|---|
| WO | 2008141830 A1 | 11/2008 |
| WO | 2008143831 A1 | 11/2008 |

* cited by examiner

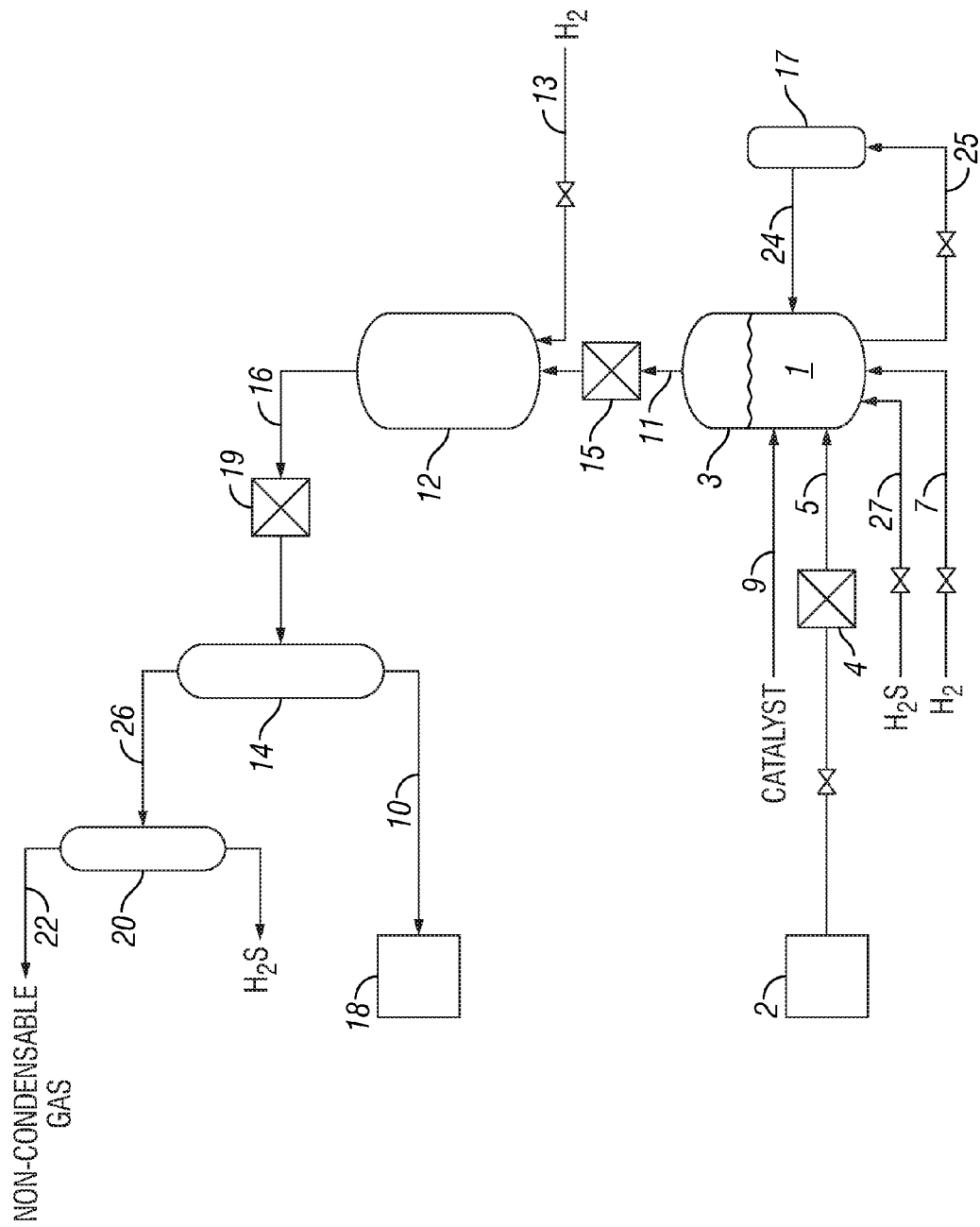

PROCESS FOR TREATING A HYDROCARBON-CONTAINING FEED

PRIORITY CLAIM

The present application claims the benefit to priority of U.S. Provisional Application No. 61/421,844 entitled "Process for Treating a Hydrocarbon-Containing Feed" filed Dec. 10, 2010.

FIELD OF THE INVENTION

The present invention is directed to a process for treating a hydrocarbon-containing feedstock.

BACKGROUND OF THE INVENTION

Increasingly, resources such as heavy crude oils, bitumen, tar sands, shale oils, and hydrocarbons derived from liquefying coal are being utilized as hydrocarbon sources due to decreasing availability of easily accessed light sweet crude oil reservoirs. These resources are disadvantaged relative to light sweet crude oils, containing significant amounts of heavy hydrocarbon fractions such as residue and asphaltenes, and often containing significant amounts of sulfur, nitrogen, metals, poly-aromatic hydrocarbon compounds, and/or naphthenic acids. The disadvantaged crudes typically require a considerable amount of upgrading, for example by cracking and by hydrotreating, in order to obtain more valuable hydrocarbon products. Cracking is generally effected by treating a crude or a heavy fraction of a crude at a temperature ranging from 375° C. to 500° C., optionally in the presence of a catalyst (catalytic cracking) and optionally in the presence of hydrogen (hydrocracking), and results in the decomposition of larger and heavier molecular weight constituents to smaller, lighter molecular weight compounds by cleavage of carbon-carbon linkages. Hydrotreating is generally effected by treating a crude or a fraction of a crude at a temperature ranging from 260° C. to 400° C. in the presence of hydrogen, and optionally in the presence of a catalyst, and results in reduction of sulfur, nitrogen, oxygen, and metals in the crude.

In conventional processes for upgrading disadvantaged heavy crude oil and bitumen feedstocks, the feedstocks are fractionated by distillation to separate the lightest distillate fractions, containing lower-boiling hydrocarbons, by atmospheric pressure distillation. Heavier fractions containing higher boiling fractions, called vacuum gas oils, are then separated from the atmospheric distillate bottoms by vacuum distillation. The heaviest fraction called residue or pitch containing the highest, non-distillable, boiling hydrocarbons is produced as the bottoms fraction from the vacuum distillation. Lighter hydrocarbons may be recovered from the vacuum gas oils and residue fractions by fluid catalytic cracking or coking. Typically, vacuum gas oils are catalytically cracked in a Fluidized Catalytic Cracker (FCC) to produce lighter hydrocarbons, non-condensable hydrocarbon gases, and coke, where the lighter hydrocarbons may be blended with other distillate fractions to make fuel products. Residue may be cracked in a coker or hydrocracked in a residue hydrocracker to produce lighter hydrocarbon fractions, heavier residue fluid, non-condensable gases, and coke, where the lighter hydrocarbon fractions may be blended with other distillate fractions to make fuel products, and the residue fluid may be further cracked in a Residue Fluidized Catalytic Cracker (RFCC) to produce more light hydrocarbons. Typically, the separated fractions may be hydrotreated to reduce sulfur, nitrogen, and metals content of the fractions since heteroatoms and metals are undesirable in hydrocarbon products produced from the light distillate fractions, and act as hydrocracking catalyst poisons in the vacuum gas oil fraction and residue fraction.

Typically in a conventional process for upgrading a disadvantaged heavy crude feed or bitumen a maximum of about 70%-75% of the carbon content of the disadvantaged crude feed material is captured as non-residue, non-asphaltenic hydrocarbons that are liquid at standard temperature and pressure (STP—25° C., 0.101 MPa), the remainder of the carbon content being produced as gaseous hydrocarbons and carbonaceous solids such as coke. Furthermore, in a conventional process a large percentage of the sulfur and nitrogen are concentrated in high molecular weight heteroatomic hydrocarbons so that the sulfur and nitrogen become refractory, rendering removal of most or all of the sulfur or nitrogen from the hydrocarbon product difficult.

Alternatively, disadvantaged heavy crude oil and bitumen feedstocks may be hydrotreated and catalytically hydrocracked to produce an upgraded hydrocarbon product without initially separating the feedstock into fractions. Current "whole crude" heavy oil or bitumen feedstock upgrading processes also suffer from the production of excess coke and gas, and typically a maximum of about 70%-75% of the carbon content of the disadvantaged crude feed material is captured as non-residue, non-asphaltenic hydrocarbons that are liquid at STP. Current "whole crude" heavy oil or bitumen feedstock upgrading processes also create substantial quantities of refractory sulfur and nitrogen heteroatomic hydrocarbon compounds thereby rendering removal of most or all of the sulfur or nitrogen from the product difficult.

Formation of coke, refractory sulfur compounds, and refractory nitrogen compounds is a particular problem in upgrading and refining heavy crudes and bitumen, whether as "whole crude" feedstocks or as fractions of a heavy crude or bitumen, that has limited the yield of desirable liquid hydrocarbons from such feedstocks. Cracking or hydrocracking, either thermal or catalytic, is required to obtain a high yield of hydrocarbons that are liquid at STP from a heavy crude or bitumen due to the large quantity of high molecular weight, heavy hydrocarbons such as residue and asphaltenes that are present in such feedstocks. Cracking hydrocarbons involves breaking bonds of the hydrocarbons, particularly carbon-carbon bonds, thereby forming two hydrocarbon radicals for each carbon-carbon bond that is cracked in a hydrocarbon molecule. Numerous reaction paths are available to the cracked hydrocarbon radicals, the most important being: 1) reaction with a hydrogen donor to form a stable hydrocarbon molecule that is smaller in terms of molecular weight than the original hydrocarbon from which it was derived; and 2) reaction with another hydrocarbon or another hydrocarbon radical to form a hydrocarbon molecule significantly larger in terms of molecular weight than the cracked hydrocarbon radical—a process called annealation. The first reaction is desired, it produces hydrocarbons of lower molecular weight than the heavy hydrocarbons contained in the feedstock—and preferably produces naphtha, distillate, or gas oil hydrocarbons. The second reaction is undesired and leads to the production of coke and refractory sulfur and nitrogen containing heteroatomic hydrocarbons. Furthermore, the second reaction is autocatalytic since the cracked hydrocarbon radicals are reactive with the growing coke particles.

Hydrocarbon-containing feedstocks having a relatively high concentration of heavy hydrocarbon molecules therein are particularly susceptible to coking due to the presence of a large quantity of high molecular weight hydrocarbons in the feedstock with which cracked hydrocarbon radicals may combine to form proto-coke or coke. As a result, yields of non-residue, non-asphaltenic hydrocarbons that are liquid at STP from heavy crude oils and bitumen have been limited by coke formation induced by the cracking reaction itself.

Furthermore, sulfur and nitrogen tend to be concentrated in high molecular weight heteroatomic hydrocarbons in heavy crude oil and bitumen feedstocks. These molecules are also particularly susceptible to annealation due to the large quantity of large, high molecular weight sulfur- and nitrogen-containing heteroatomic hydrocarbons in heavy oil and bitumen feedstocks. As a result, large quantities of refractory sulfur- and nitrogen-containing heteroatomic hydrocarbons are formed in conventional cracking processes when utilizing a heavy crude oil or bitumen as a feedstock. A desirable characteristic of coking is that it tends to concentrate large aromatic ring structures, sulfur, nitrogen, and metals in the coke—leaving cracked, lighter hydrocarbon fragments of improved quality relative to the residue fraction of the feedstock—but this concentration effect is obtained at considerable expense in liquid product yield.

Numerous catalysts have been developed for use in processes for hydroprocessing disadvantaged hydrocarbon feedstocks, either as "whole crude" feeds or as heavy fractions of a heavy crude oil or bitumen, however, such catalysts have not eliminated problems associated with coking and production of refractory sulfur and nitrogen compounds, and catalyst activity may be significantly reduced over time by accumulation of coke on the catalyst. The formation of coke or sediment may be controlled by limiting the degree of conversion of residue range hydrocarbon in the feedstock to lighter hydrocarbons, which results in a yield loss with respect to the lighter, higher valued, hydrocarbon fractions. If not controlled, the formation of insoluble coke or sediment may lead to detrimental fouling of the residue hydroprocessing equipment and catalysts.

Conventional hydrocracking catalysts are generally selected to possess acidic properties that catalytically facilitate cracking by promoting the formation of cracked radical carbocation hydrocarbon species from hydrocarbons in the feedstock. Such catalysts typically include an acidic support, usually formed of alumina, silica, titania, or alumina-silica, on which a Group VIB metal or metal compound and/or a Group VIII metal or metal compound is deposited or interspersed to catalyze hydrogenation of the cracked radical hydrocarbon species. These catalysts likely promote the formation of coke and refractory sulfur and nitrogen compounds since they induce the formation of highly unstable and highly reactive carbocation radical hydrocarbon species without concomitantly hydrogenating the highly reactive carbocation radical hydrocarbon species as they are formed, thereby permitting a portion of the highly reactive radical hydrocarbon species to react with other hydrocarbons, heteroatomic hydrocarbons, or hydrocarbon radicals to form proto-coke or coke, and/or refractory heteroatomic sulfur- and nitrogen-containing hydrocarbons.

Improved processes for processing heavy hydrocarbon-containing feedstocks to produce a lighter hydrocarbon-containing crude product are desirable, particularly in which coke formation is significantly reduced or eliminated, the yield of non-residue, non-asphaltenic hydrocarbons that are liquid at STP is increased so that at least 80%—and more preferably at least 90%—of the carbon content in the feed is captured in non-residue, non-asphaltenic hydrocarbons that are liquid at STP, and which contain little refractory sulfur- and nitrogen-containing hydrocarbon compounds.

SUMMARY OF THE INVENTION

In one aspect, the present invention is directed to a process, comprising:

providing a hydrocarbon-containing feedstock to a mixing zone, where the hydrocarbon-containing feedstock is selected to contain at least 20 wt. % hydrocarbons having a boiling point of greater than 538° C. as determined in accordance with ASTM Method D5307;

providing a metal-containing catalyst to the mixing zone;

continuously or intermittently providing hydrogen to the mixing zone; continuously or intermittently providing hydrogen sulfide to the mixing zone, where the hydrogen sulfide is provided to the mixing zone at a mole ratio of hydrogen sulfide to hydrogen provided to the mixing zone of at least 1:10;

blending the hydrogen, hydrogen sulfide, hydrocarbon-containing feedstock, and the metal-containing catalyst in the mixing zone at a temperature of from 375° C. to 500° C. and at a pressure of from 6.9 MPa to 27.5 MPa to produce:
  a) a vapor comprised of hydrocarbons that are vaporizable at the temperature and the pressure within the mixing zone; and
  b) a hydrocarbon-depleted feed residuum comprising hydrocarbons that are liquid at the temperature and pressure within the mixing zone;

continuously or intermittently separating at least a portion of the vapor from the mixing zone while retaining in the mixing zone at least a portion of the hydrocarbon-depleted feed residuum comprising hydrocarbons that are liquid at the temperature and pressure within the mixing zone, wherein the vapor separated from the mixing zone contains a first hydrocarbon-containing product comprised of one or more hydrocarbon compounds that are liquid at STP; and apart from the mixing zone, contacting the first hydrocarbon-containing product with hydrogen and a catalyst comprising a Column 6 metal of the Periodic Table or a compound thereof at a temperature of from 260° C. to 425° C. and a pressure of from 3.4 MPa to 27.5 MPa to produce a second hydrocarbon-containing product.

BRIEF DESCRIPTION OF THE DRAWINGS

FIG. 1 is a schematic of a system useful for practicing the process of the present invention.

DETAILED DESCRIPTION OF THE INVENTION

The present invention is directed to a process for treating a hydrocarbon-containing feedstock, particularly a heavy hydrocarbon-containing feedstock such as a heavy crude oil or bitumen that contains at least 20 wt. % of hydrocarbons having a boiling point of greater than 538° C., as determined in accordance with ASTM Method D5307, to produce a liquid hydrocarbon product. The hydrocarbon-containing feedstock is mixed with hydrogen, hydrogen sulfide and a metal-containing catalyst, where the metal-containing catalyst is preferably a Lewis base, at a temperature of from 375° C. to 500° C. at a pressure of from 6.9 MPa to 27.5 MPa to catalytically hydrocrack the hydrocarbon-containing feedstock. The hydrogen sulfide and hydrogen are mixed with the feedstock and catalyst at a mole ratio of hydrogen sulfide to hydrogen of at least 1:10. Hydrocarbons in the mixture that vaporize at the temperature and pressure of the hydrocracking reaction, including lower molecular weight hydrocarbons initially in the hydrocarbon-containing feedstock and hydrocracked hydrocarbons generated by catalytically hydrocracking hydrocarbons in the hydrocarbon-containing feedstock, are separated from the mixture as a vapor. Preferably, a hydrocarbon-depleted feed residuum comprising hydrocarbons that are liquid at the temperature and pressure at which the mixing is effected is retained in the mixture along with the catalyst while the vapor is separated from the mixture. The vapor comprises hydrogen, hydrogen sulfide, hydrocarbons that are gaseous at STP, and a first hydrocarbon-containing product that is comprised of one or more hydrocarbon compounds that are liquid at STP. Apart from the mixture, the first hydrocarbon-containing product is hydrotreated to produce a second hydrocarbon-containing product by contacting the first hydrocarbon-containing product with a catalyst comprising a Column 6 metal of the Periodic Table, or a compound thereof, at a temperature of from 260° C. to 425° C. and a pressure of from 3.4 MPa to 27.5 MPa. The first hydrocarbon-containing product may condensed and separated from the hydrocarbons that are gaseous at STP, hydrogen, and hydrogen sulfide in the vapor prior to hydrotreating, or the entire vapor containing the first hydrocarbon-containing product may be hydrotreated without separating the first hydrocarbon-containing product. The hydrotreating step is effective to substantially reduce the sulfur content and nitrogen content of the second hydrocarbon-containing product relative to the first hydrocarbon-containing product, and is effective to substantially increase the ratio of mono- and di-aromatic hydrocarbon compounds to poly-aromatic hydrocarbon compounds containing three or more aromatic rings in the second hydrocarbon-containing product relative to the hydrocarbon-containing feedstock.

The process of the present invention is effective to upgrade a hydrocarbon-containing feedstock containing substantial quantities of heavy hydrocarbons to a desirable liquid hydrocarbon product. In particular, the second hydrocarbon containing product is a liquid at STP that contains at least 80%, or at least 85%, and typically at least 90% or at least 95% of the carbon content of the hydrocarbon-containing feedstock; that contains less than 1 wt. % of hydrocarbon compounds having a boiling point of greater than 538° C. (1000° F.) as determined in accordance with ASTM Method D5307 (residue and asphaltenic hydrocarbon compounds); and that contains at most 10 wt. % of the sulfur content of the hydrocarbon-containing feedstock where at most 1500 parts per million of the sulfur is contained in hydrocarbons having a boiling point of greater than 343° C. (650° F.), and at most 50 wt. % of the nitrogen content of the hydrocarbon-containing feedstock where at most 1000 parts per million of the nitrogen is contained in hydrocarbons having a boiling point of greater than 343° C. (650° F.). The second hydrocarbon-containing product may also have very little metal content. The second hydrocarbon-containing product may contain less than 5 parts per million, by weight, of vanadium and/or less than 5 parts per million, by weight, of nickel, and/or less than 5 parts per million, by weight, of iron. The second hydrocarbon-containing product may also have a ratio of mono- and di-aromatic to polyaromatic compounds containing three or more aromatic rings of at least 4:1.

The process of the present invention may be effective to capture at least 80%, or at least 85%, and typically at least 90% or at least 95%, of the carbon content of the heavy hydrocarbon-containing feedstock in a liquid hydrocarbon product containing minimal amounts of residue and asphaltenes; to produce a liquid hydrocarbon product containing little of the sulfur, nitrogen, and metals content of the heavy hydrocarbon-containing feedstock where little of the sulfur and nitrogen content is refractory; and to produce a liquid hydrocarbon product having a high ratio of mono- and di-aromoatic hydrocarbon compounds to poly-aromatic hydrocarbon compounds in part, because 1) the process is effective to crack a heavy hydrocarbon-containing feedstock while producing little coke or other toluene-insoluble carbonaceous solids; and 2) the catalytic hydrocracking step may preferentially convert high molecular weight heteroatomic hydrocarbon compounds to easily hydrotreated lower molecular weight sulfur and nitrogen compounds which are subsequently removed by a catalytic hydrotreating step.

Although not intending the present invention to be limited thereby, it is believed that the production of coke and refractory sulfur and nitrogen compounds is inhibited in the catalytic hydrocracking step of the process of the invention, in part, because hydrogen sulfide, in sufficient quantities, acts as a catalyst in hydrocracking the hydrocarbon-containing feedstock when utilized with a relatively non-acidic metal-containing catalyst by opening an additional reaction pathway for forming desirable hydrocracked, hydrogenated hydrocarbons—selectively directing reactions occurring in the cracking process to avoid and/or inhibit coke formation and/or refractory sulfur and nitrogen compound formation.

In the hydrocracking step of the process of the present invention, hydrogen sulfide and hydrogen each may act as an atomic hydrogen donor to hydrogenate a cracked hydrocarbon radical to produce a stable hydrocarbon having a smaller molecular weight than the hydrocarbon from which the hydrocarbon radical was derived. In sufficient quantities, hydrogen sulfide reacts much more rapidly to hydrogenate a cracked hydrocarbon radical than hydrogen since the reaction of hydrogen sulfide with a cracked hydrocarbon radical to hydrogenate the radical is substantially more energetically favored than hydrogenation of the cracked hydrocarbon radical by hydrogen. It is believed, therefore, that hydrogen sulfide, in sufficient quantities, may inhibit annealation of cracked hydrocarbon radicals by rapidly reacting with the cracked hydrocarbon radicals before the cracked hydrocarbon radicals react with another hydrocarbon.

Furthermore, the thiol group remaining after hydrogen sulfide has provided a hydrogen atom to a cracked hydrocarbon radical may be provided to another hydrocarbon radical, thereby forming a meta-stable thiol-containing hydrocarbon. The thiol of the meta-stable thiol-containing hydrocarbon may be replaced by a hydrogen atom from either another hydrogen sulfide molecule or hydrogen. This reaction sequence may be described chemically as follows:

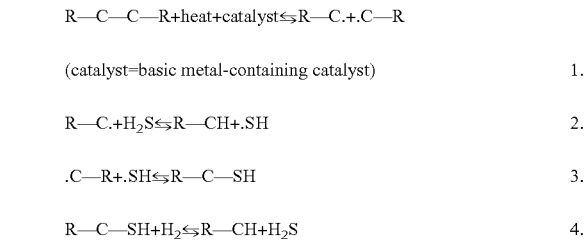

Thus, hydrogen sulfide may open up another reaction pathway for conversion of a cracked hydrocarbon to its hydrogenated counterpart—enhancing the rate of the reaction for forming cracked, hydrogenated hydrocarbons and reducing the opportunity for cracked hydrocarbon radicals to react with another hydrocarbon.

It is also believed that hydrogen sulfide may act to provide a hydrogen atom to a cracked hydrocarbon radical significantly further from a metal-containing catalyst surface than hydrogen, and, after donation of a hydrogen atom, may accept a hydrogen atom from hydrogen near the surface of the catalyst. It is believed, therefore, that hydrogen sulfide may act as an atomic hydrogen shuttle to provide atomic hydrogen to a cracked hydrocarbon radical at a distance from the non-acidic metal-containing catalyst, also reducing the opportunity for cracked hydrocarbon radicals to react with another hydrocarbon to form coke.

Certain terms that are used herein are defined as follows:

"Acridinic compound" refers to a hydrocarbon compound including the structure:

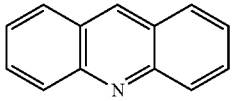

As used in the present application, an acridinic compound includes any hydrocarbon compound containing the above structure, including, naphthenic acridines, napththenic benzoacridines, and benzoacridines, in addition to acridine.

"Anaerobic conditions" means "conditions in which less than 0.5 vol. % oxygen as a gas is present". For example, a process that occurs under anaerobic conditions, as used herein, is a process that occurs in the presence of less than 0.5 vol. % oxygen in a gaseous form. Anaerobic conditions may be such that no detectable oxygen gas is present.

"Aqueous" as used herein is defined as containing more than 50 vol. % water. For example, an aqueous solution or aqueous mixture, as used herein, contains more than 50 vol. % water.

"ASTM" refers to American Standard Testing and Materials.

"Atomic hydrogen percentage" and "atomic carbon percentage" of a hydrocarbon-containing material—including crude oils, crude products such as syncrudes, bitumen, tar sands hydrocarbons, shale oil, crude oil atmospheric residues, crude oil vacuum residues, naphtha, kerosene, diesel, VGO, and hydrocarbons derived from liquefying coal—are as determined by ASTM Method D5291.

"API Gravity" refers to API Gravity at 15.5° C., and as determined by ASTM Method D6822.

"Benzothiophenic compound" refers to a hydrocarbon compound including the structure:

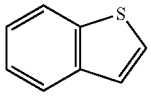

As used in the present application, a benzothiophenic compound includes any hydrocarbon compound containing the above structure, including di-benzothiophenes, naphthenic-benzothiophenes, napththenic-di-benzothiophenes, benzo-naphtho-thiophenes, naphthenic-benzo-naphthothiophenes, and dinaphtho-thiophenes, in addition to benzothiophene.

"BET surface area" refers to a surface area of a material as determined by ASTM Method D3663.

"Blending" as used herein is defined to mean contact of two or more substances by intimately admixing the two or more substances.

Boiling range distributions for a hydrocarbon-containing material may be as determined by ASTM Method D5307.

"Bond" as used herein with reference to atoms in a molecule may refer to a covalent bond, a dative bond, or an ionic bond, dependent on the context.

"Carbazolic compound" refers to a hydrocarbon compound including the structure:

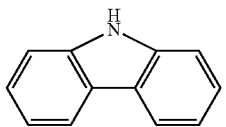 [SMILES: c1ccc2c(c1)[nH]c1ccccc12]

As used in the present application, a carbazolic compound includes any hydrocarbon compound containing the above structure, including naphthenic carbazoles, benzocarbazoles, and napthenic benzocarbazoles, in addition to carbazole.

"Carbon number" refers to the total number of carbon atoms in a molecule.

"Catalyst" refers to a substance that increases the rate of a chemical process and/or that modifies the selectivity of a chemical process as between potential products of the chemical process, where the substance is not consumed by the process. A catalyst, as used herein, may increase the rate of a chemical process by reducing the activation energy required to effect the chemical process. Alternatively, a catalyst, as used herein, may increase the rate of a chemical process by modifying the selectivity of the process between potential products of the chemical process, which may increase the rate of the chemical process by affecting the equilibrium balance of the process. Further, a catalyst, as used herein, may not increase the rate of reactivity of a chemical process but may merely modify the selectivity of the process as between potential products.

"Catalyst acidity by ammonia chemisorption" refers to the acidity of a catalyst substrate as measured by volume of ammonia adsorbed by the catalyst substrate and subsequently desorbed from the catalyst substrate as determined by ammonia temperature programmed desorption between a temperature of 120° C. and 550° C. For clarity, a catalyst that is decomposed in the measurement of acidity by ammonia temperature programmed desorption to a temperature of 550° C., e.g. a salt, and/or a catalyst for which a measurement of acidity may not be determined by ammonia temperature programmed desorption, e.g. a liquid, is defined for purposes of the present invention to have an indefinite acidity as measured by ammonia chemisorption. Ammonia temperature programmed desorption measurement of the acidity of a catalyst is effected by placing a catalyst sample that has not been exposed to oxygen or moisture in a sample container such as a quartz cell; transferring the sample container containing the sample to a temperature programmed desorption analyzer such as a Micrometrics TPD/TPR 2900 analyzer; in the analyzer, raising the temperature of the sample in helium to 550° C. at a rate of 10° C. per minute; cooling the sample in helium to 120° C.; alternately flushing the sample with ammonia for 10 minutes and with helium for 25 minutes a total of 3 times, then measuring the amount of ammonia desorbed from the sample in the temperature range from 120° C. to 550° C. while raising the temperature at a rate of 10° C. per minute.

"Coke" is a solid carbonaceous material that is formed primarily of a hydrocarbonaceous material and that is insoluble in toluene as determined by ASTM Method D4072.

"Cracking" as used herein with reference to a hydrocarbon-containing material refers to breaking hydrocarbon molecules in the hydrocarbon-containing material into hydrocarbon fragments, where the hydrocarbon fragments have a lower molecular weight than the hydrocarbon molecule from which they are derived. Cracking conducted in the presence of an atomic hydrogen donor may be referred to as hydrocracking. Cracking effected by temperature in the absence of a catalyst may be referred to a thermal cracking. Cracking may also produce some of the effects of hydrotreating such as sulfur reduction, metal reduction, nitrogen reduction, and reduction of TAN.

"Diesel" refers to hydrocarbons with a boiling range distribution from 260° C. up to 343° C. (500° F. up to 650° F.) as determined in accordance with ASTM Method D5307. Diesel content may be determined by the quantity of hydrocarbons having a boiling range of from 260° C. to 343° C. relative to a total quantity of hydrocarbons as measured by boiling range distribution in accordance with ASTM Method D5307.

"Dispersible" as used herein with respect to mixing a solid, such as a salt, in a liquid is defined to mean that the components that form the solid, upon being mixed with the liquid, are retained in the liquid at STP for a period of at least 24 hours upon cessation of mixing the solid with the liquid. A solid material is dispersible in a liquid if the solid or its components are soluble in the liquid. A solid material is also dispersible in a liquid if the solid or its components form a colloidal dispersion or a suspension in the liquid.

"Distillate" or "middle distillate" refers to hydrocarbons with a boiling range distribution from 204° C. up to 343° C. (400° F. up to 650° F.). Distillate content is as determined by ASTM Method D5307. Distillate may include diesel and kerosene.

"Hydrogen" as used herein refers to molecular hydrogen unless specified as atomic hydrogen.

"Insoluble" as used herein refers to a substance a majority (at least 50 wt. %) of which does not dissolve in a liquid upon being mixed with the liquid at a specified temperature and pressure, where the undissolved portion of the substance can be recovered from the liquid by physical means. For example, a fine particulate material dispersed in a liquid is insoluble in the liquid if 50 wt. % or more of the material may be recovered from the liquid by centrifugation and filtration.

"IP" refers to the Institute of Petroleum, now the Energy Institute of London, United Kingdom.

"Kerosene" refers to hydrocarbons with a boiling range distribution from 204° C. up to 260° C. (400° F. up to 500° F.) at a pressure of 0.101 MPa. Kerosene content may be determined by the quantity of hydrocarbons having a boiling range of from 204° C. to 260° C. at a pressure of 0.101 MPa relative to a total quantity of hydrocarbons as measured by boiling range distribution in accordance with ASTM Method D5307.

"Lewis base" refers to a compound and/or material with the ability to donate one or more electrons to another compound.

"Ligand" as used herein is defined as a molecule, compound, atom, or ion bonded to, or capable of bonding with, a metal ion in a coordination complex.

"Light hydrocarbons" refers to hydrocarbons having carbon numbers in a range from 1 to 4.

"Mixing" as used herein is defined as contacting two or more substances by intermingling the two or more substances. Blending, as used herein, is a subclass of mixing, where blending requires intimately admixing or intimately intermingling the two or more substances, for example into a homogenous dispersion.

"Monomer" as used herein is defined as a molecular compound or portion of a molecular compound that may be reactively joined with itself or another monomer in repeated linked units to form a polymer.

"Naphtha" refers to hydrocarbon components with a boiling range distribution from 38° C. up to 204° C. (100° F. up to 400° F.). Naphtha content may be determined by the quantity of hydrocarbons having a boiling range of from 38° C. to 204° C. at a pressure of 0.101 MPa relative to a total quantity of hydrocarbons as measured by boiling range distribution in accordance with ASTM Method D5307. Content of hydrocarbon components, for example, paraffins, iso-paraffins, olefins, naphthenes and aromatics in naphtha are as determined by ASTM Method D6730.

"Non-condensable gas" refers to components and/or a mixture of components that are gases at STP.

When two or more elements are described as "operatively connected", the elements are defined to be directly or indirectly connected to allow direct or indirect fluid flow between the elements.

"Periodic Table" refers to the Periodic Table as specified by the International Union of Pure and Applied Chemistry (IUPAC), November 2003. As used herein, an element of the Periodic Table of Elements may be referred to by its symbol in the Periodic Table. For example, Cu may be used to refer to copper, Ag may be used to refer to silver, W may be used to refer to tungsten etc.

"Polyaromatic compounds" refer to compounds that include three or more aromatic rings. Examples of polyaromatic compounds include, but are not limited to anthracene and phenanthrene.

"Polymer" as used herein is defined as a compound comprised of repetitively linked monomers.

"Pore size distribution" refers a distribution of pore size diameters of a material as measured by ASTM Method D4641, or if specifically referred to as being measured by mercury porisimetry, as measured by ASTM Method D4284.

"SCFB" refers to standard cubic feet of a gas per barrel of crude feed.

"STP" as used herein refers to Standard Temperature and Pressure, which is 25° C. and 0.101 MPa.

"TAN" refers to a total acid number expressed as milligrams ("mg") of KOH per gram ("g") of sample. TAN is as determined by ASTM Method D664.

"VGO" refers to hydrocarbons with a boiling range distribution of from 343° C. up to 538° C. (650° F. up to 1000° F.) at 0.101 MPa. VGO content may be determined by the quantity of hydrocarbons having a boiling range of from 343° C. to 538° C. at a pressure of 0.101 MPa relative to a total quantity of hydrocarbons as measured by boiling range distribution in accordance with ASTM Method D5307.

"wppm" as used herein refers to parts per million, by weight.

The present invention is directed to a process for hydrocracking and then hydrotreating a heavy hydrocarbon-containing feedstock such as a heavy crude oil or bitumen to produce a liquid hydrocarbon product, where the heavy hydrocarbon feedstock contains at least 20 wt. % of hydrocarbons having a boiling point of at least 538° C. as determined in accordance with ASTM Method 5307. The process is effected by first catalytically hydrocracking the heavy hydrocarbon-containing feedstock by mixing the feedstock with a relatively non-acidic metal-containing catalyst containing a metal sulfide, hydrogen, and hydrogen sulfide at a temperature of from 375° C. to 500° C. at a pressure of from 6.9 MPa (500 psi) to 27.5 MPa (4000 psi), where the hydrogen sulfide and hydrogen are provided for mixing at a mole ratio of hydrogen sulfide to hydrogen of at least 1:10. A vapor is produced by the catalytic hydrocracking step, where the vapor is comprised of hydrocarbons of the heavy hydrocarbon-containing feedstock that are vaporized at the temperature and pressure of the mixing, cracked hydrocarbons that are vaporized at the temperature and pressure of the mixing, hydrogen, and hydrogen sulfide. The vapor contains a first hydrocarbon-containing product comprised of hydrocarbons that are liquid at STP. The vapor is separated from the mixture to provide the first-hydrocarbon-containing product, leaving a hydrocarbon-depleted feed residuum that is comprised of hydrocarbons that are liquid at the hydrocracking temperature and pressure. Apart from the mixture, the first hydrocarbon-containing product of the vapor is then hydrotreated by contacting the first hydrocarbon-containing product with hydrogen and a catalyst comprising a Column 6 metal of the Periodic Table or a compounds thereof at a temperature of from 260° C. to 425° C. and a pressure of from 3.4 MPa to 27.5 MPa to produce a second hydrocarbon-containing product. The first hydrocarbon-containing product may be separated from the vapor prior to hydrotreatment by condensing the first hydrocarbon-containing product from the vapor, or the vapor itself may be hydrotreated to hydrotreat the first hydrocarbon-containing product. The second hydrocarbon containing-product is a liquid at STP and contains at least 80%, or at least 85%, or at least 90% of the carbon from the heavy hydrocarbon feedstock where at most 3 wt. % of the second hydrocarbon-containing product has a boiling point of greater than 538° C. (1000° F.) as determined in accordance with ASTM Method D5307. The second hydrocarbon-containing product also contains at most 10 wt. % of the sulfur of the heavy hydrocarbon feedstock, where at most 1500 wppm of the sulfur is contained in compounds having a boiling point of greater than 343° C. (650° F.); and also contains at most 50 wt. % of the nitrogen of the heavy hydrocarbon feedstock, where at most 1000 wppm of the nitrogen is contained in compounds having a boiling point of greater than 343° C. (650° F.). The second hydrocarbon-containing product may also contain less than 0.5 wppm vanadium, less than 0.5 wppm nickel, and less than 0.5 wppm iron.

Catalytically Hydrocracking a Heavy Hydrocarbon-Containing Feedstock

Hydrocarbon-Containing Feedstock

The hydrocarbon-containing feedstock that is utilized in the process of the present invention contains heavy hydrocarbons that are subject to being cracked in the process. The hydrocarbon-containing feedstock, therefore, is selected to contain at least 20 wt. % hydrocarbons having a boiling point of greater than 538° C. The amount of hydrocarbons having a boiling point of greater than 538° C. in a hydrocarbon-containing material may be determined in accordance with ASTM Method D5307. The hydrocarbon-containing feedstock may be selected to contain at least 25 wt. %, or at least 30 wt. %, or at least 35 wt. %, or at least 40 wt. %, or at least 45 wt. %, or at least 50 wt. % hydrocarbons having a boiling point of greater than 538° C. The hydrocarbon-containing feedstock may be selected to contain at least 20 wt. % residue, or at least 25 wt. % residue, or at least 30 wt. % residue, or at least 35 wt. % residue, or at least 40 wt. % residue, or at least 45 wt. % residue, or least 50 wt. % residue.

The hydrocarbon-containing feedstock may contain significant quantities of lighter hydrocarbons as well as the heavy hydrocarbons. The hydrocarbon-containing feedstock may contain at least 30 wt. %, or at least 35 wt. %, or at least 40 wt. %, or at least 45 wt. %, or at least 50 wt. % of hydrocarbons having a boiling point of 538° C. or less. The amount of hydrocarbons having a boiling point of 538° C. or less in a hydrocarbon-containing material may be determined in accordance with ASTM Method D5307. The hydrocarbon-containing feedstock may contain at least 20 wt. %, or at least 25 wt. %, or at least 30 wt. %, or at least 35 wt. %, or at least 40 wt. %, or at least 45 wt. % of distillate and VGO hydrocarbons. The hydrocarbon-containing feedstock may be a whole crude oil, or may be a topped crude oil.

The hydrocarbon-containing feedstock may also contain quantities of sulfur and nitrogen. The hydrocarbon-containing feedstock may contain at least 2 wt. % sulfur, or at least 3 wt. %, or at least 5 wt. % sulfur as determined in accordance with ASTM Method D4294; and the hydrocarbon-containing feedstock may contain at least 0.25 wt. % nitrogen, or at least 0.4 wt. % nitrogen.

The process of the present invention is particularly applicable to certain heavy petroleum feedstocks. The hydrocarbon-containing feedstock may be a heavy or an extra-heavy crude oil containing significant quantities of residue or pitch; a topped heavy or topped extra-heavy crude oil containing significant quantities of residue or pitch; bitumen; hydrocarbons derived from tar sands; shale oil; crude oil atmospheric residues; crude oil vacuum residues; and asphalts.

Hydrogen

The hydrogen that is mixed with the hydrocarbon-containing feedstock, the catalyst, and hydrogen sulfide in the catalytic hydrocracking step of the process of the present invention is derived from a hydrogen source. The hydrogen source may be hydrogen gas obtained from any conventional sources or methods for producing hydrogen gas, for example steam reforming or partially oxidizing methane or a natural gas.

Hydrogen Sulfide

The hydrogen sulfide that is mixed with the hydrocarbon-containing feedstock, the catalyst, and hydrogen in the catalytic hydrocracking step of the process of the present invention is derived from a hydrogen sulfide source. The hydrogen sulfide source may be hydrogen sulfide gas separated from a subsurface geological formation, e.g. an oil or natural gas reservoir. The hydrogen sulfide source may be a chemical reaction that produces hydrogen sulfide, for example, the reaction of molten elemental sulfur with hydrogen at a temperature of 450° C. At least a portion of the hydrogen sulfide may be recovered from the vapor produced by the hydrocracking step of the process of the present invention and recycled to be mixed with the hydrocarbon-containing feedstock, the catalyst, and hydrogen.

The hydrogen sulfide is provided for mixing with the hydrocarbon-containing feedstock, the catalyst, and hydrogen in an amount sufficient for the hydrogen sulfide to provide a demonstrable catalytic effect in the hydrocracking step. To provide a demonstrable catalytic effect in the hydrocracking step, hydrogen sulfide is provided to be mixed with the hydrocarbon-containing feedstock, the catalyst, and hydrogen in an amount on a mole ratio basis relative to hydrogen of at least 1 mole of hydrogen sulfide per 10 moles hydrogen. The hydrogen sulfide may be provided in an amount on a mole ratio basis relative to the hydrogen provided of at least 1.5:10.0, or at least 1.0:5.0, or at least 1.0:4.0, or at least 3.0:10.0, or at least 2.0:5.0.

Non-Acidic Metal-Containing Hydrocracking Catalyst

The catalyst utilized in the process of the present invention in the catalytic hydrocracking step is relatively non-acidic and contains a metal, preferably a metal-sulfide. The relatively non-acidic catalyst has an acidity as measured by ammonia chemisorption of at most 500 μmol ammonia desorbed from the catalyst per gram of catalyst. More preferably a non-acidic metal-containing catalyst utilized in the catalytic hydrocracking step of the process of the present invention has an acidity as measured by ammonia chemisorption of at most 200, or at most 100, or at most 50, or at most 25, or at most 10 μmol ammonia desorbed from the catalyst per gram of catalyst, and most preferably has an acidity as measured by ammonia chemisorption of 0 μmol ammonia desorbed from the catalyst per gram of catalyst. In an embodiment, any metal-containing catalyst utilized in the catalytic hydrocracking step of the process of the present invention comprises at most 0.1 wt. %, or at most 0.01 wt. %, or at most 0.001 wt. % of alumina, alumina-silica, or silica, and, preferably, the one or more transition metal-containing catalysts contain no detectable alumina, alumina-silica, or silica.

The metal-containing catalyst utilized in the catalytic hydrocracking step of the process of the present invention preferably has little or no acidity to avoid catalyzing the formation of hydrocarbon radical cations and thereby avoid catalyzing the formation of coke and refractory sulfur and nitrogen compounds in the course of hydrocracking the hydrocarbon-containing feedstock. It is believed that a non-acidic, Lewis basic, metal-containing catalyst is highly effective for use in cracking a heavy hydrocarbon-containing feedstock due, at least in part, to the ability of the catalyst to donate or share electrons with hydrocarbons (i.e. to assist in reducing the hydrocarbon when the hydrocarbon is cracked so the hydrocarbon forms a hydrocarbon radical anion). It is believed that the hydrocarbons of the hydrocarbon-containing feedstock are cracked in the hydrocracking step of the process of the present invention by a Lewis base mediated reaction, wherein a Lewis base metal-containing catalyst facilitates a reduction at the site of the hydrocarbon where the hydrocarbon is cracked, forming two hydrocarbon radical anions from an initial hydrocarbon compound. Hydrocarbon radical anions are most stable when present on a primary carbon atom, therefore, formation of primary hydrocarbon radical anions may be energetically favored when a hydrocarbon is cracked in accordance with the process of the present invention, or the cracked hydrocarbon may rearrange to form the more energetically favored primary radical anion. Should the primary radical anion react with another hydrocarbon to form a larger hydrocarbon, the reaction will result in the formation of a secondary carbon-carbon bond that is susceptible to being cracked again. However, since hydrocarbon radical anions are relatively stable they are more likely to be hydrogenated by hydrogen or hydrogen sulfide present in the reaction mixture rather than react with another hydrocarbon in an annealtion reaction, and significant hydrocarbon radical anion-hydrocarbon reactions may be unlikely. As a result, little coke may be formed by agglomeration of cracked hydrocarbons and little refractory sulfur or nitrogen compounds may be formed by agglomeration of cracked hydrocarbons with heteroatomic hydrocarbons or by agglomeration of cracked heteroatomic hydrocarbons with hydrocarbons.

Conventional hydrocracking catalysts utilize an active hydrogenation metal, for example a Group VIB (Column 6 of the Periodic Table) metal such as molybdenum and/or Group VIII (Columns 7-10 of the Periodic Table) metal such as nickel, on a support having Lewis acid and/or Bronsted-Lowry acid properties, for example, silica, alumina-silica, or alumina supports. The acidic support catalyzes cracking hydrocarbons and the active hydrogenation metal catalyzes hydrogenation of the cracked hydrocarbon radicals. It is believed that cracking heavy hydrocarbons in the presence of a catalyst having significant acidity results in the formation of cracked hydrocarbon radical cations rather than hydrocarbon radical anions. Hydrocarbon radical cations are most stable when present on a tertiary carbon atom, therefore, cracking may be energetically directed to the formation of tertiary hydrocarbon radical cations, or, most likely, the cracked hydrocarbon may rearrange to form the more energetically favored tertiary radical cation. Hydrocarbon radical cations are unstable relative to hydrocarbon radical anions, and may react rapidly with other hydrocarbons. Should the tertiary radical cation react with another hydrocarbon to form a larger hydrocarbon, the reaction may result in the formation of a carbon-carbon bond that is not susceptible to being cracked again. As a result, coke and refractory sulfur and nitrogen compounds are formed by agglomeration of the cracked hydrocarbons and heteroatomic hydrocarbons in a cracking process utilizing a conventional cracking catalyst having an acidic support or carrier.

In a preferred embodiment, the relatively non-acidic, Lewis basic catalyst utilized in the hydrocracking step of the process of the present invention is a thiometallate catalyst that is a material comprised of a first metal, a second metal, and sulfur; where the first metal is selected from the group consisting of copper (Cu), nickel (Ni), cobalt (Co), iron (Fe), bismuth (Bi), silver (Ag), manganese (Mn), zinc (Zn), tin (Sn), ruthenium (Ru), lanthanum (La), praseodymium (Pr), samarium (Sm), europium (Eu), ytterbium (Yb), lutetium (Lu), dysprosium (Dy), lead (Pb), and antimony (Sb), and where the second metal is selected from the group consisting of molybdenum (Mo), tungsten (W), tin (Sn), and antimony (Sb), where the second metal is not the same as the first metal. The thiometallate catalyst may comprise a tetrathiometallate material.

The non-acidic thiometallate catalyst may have a structure wherein at least a portion of the material of the catalyst is comprised of the first metal and the second metal having a structure according to formula (I)

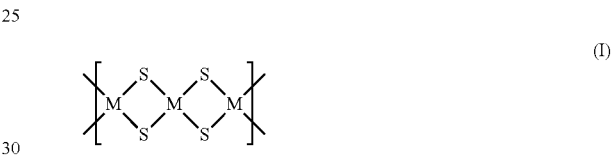

(I)

where M is either the first metal or the second metal, and at least one M is the first metal and at least one M is the second metal. The material of the catalyst as shown in formula (I) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal.

Alternatively, the non-acidic thiometallate catalyst may have a structure in which the catalyst material is comprised of at least three linked chain elements, the chain elements comprising a first chain element including the first metal and having a structure according to formula (II) and a second chain element including the second metal and having a structure according to formula (III)

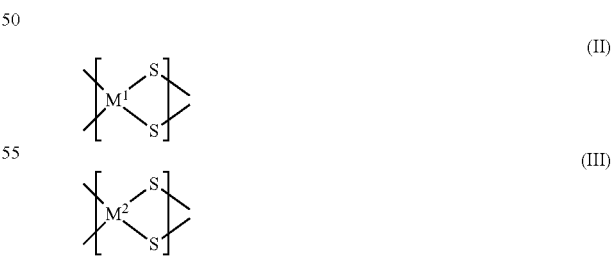

(II)

(III)

where $M^1$ is the first metal, where $M^2$ is the second metal, where the catalyst material is comprised of at least one first chain element and at least one second chain element, and where chain elements in the material are linked by bonds between the two sulfur atoms of a chain element and the metal of an adjacent chain element. The material of the non-acidic thiometallate catalyst may comprise a third chain element comprised of sulfur and a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal. The third chain element has a structure according to formula (IV):

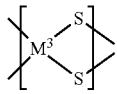
(IV)

where $M^3$ is the third metal. If the material of the catalyst contains a third chain element, at least a portion of the third chain element of the material of the catalyst is linked by bonds between the two sulfur atoms of a chain element and the metal of an adjacent chain element.

The material of the non-acidic thiometallate catalyst may be a polythiometallate polymer formed of repeating monomeric units having the structure (V) or (VI):

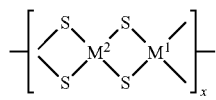
(V)

where $M^1$ is the first metal, where $M^2$ is the second metal, and where x is at least two;

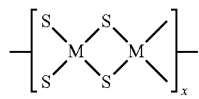
(VI)

where M is either the first metal or the second metal, at least one M is the first metal, at least one M is the second metal, and where x is at least 2.

At least a portion of the material of the catalyst may be comprised of the first metal, the second metal, and sulfur having a structure according to formula (VII):

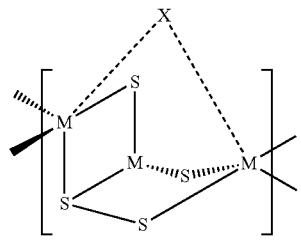
(VII)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. For example, the material of the catalyst may contain copper thiometallate-sulfate having the structure shown in formula (VIII):

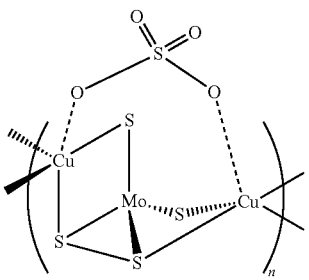
(VIII)

where n may be an integer greater than or equal to 1. The material of the catalyst as shown in formula (VII) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, where M is either the first metal, or the second metal, or the third metal, and at least one M is the first metal, at least one M is the second metal, and at least one M is the third metal. The portion of the material of the catalyst comprised of the first metal, the second metal, and sulfur may also have a polymeric structure according to formula (IX):

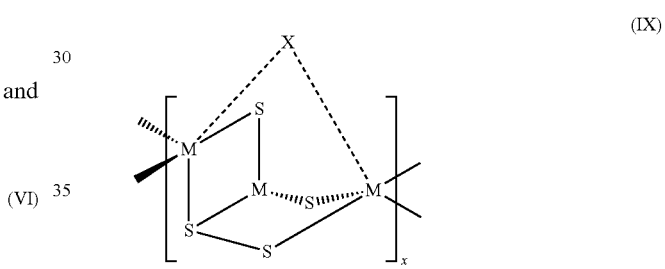
(IX)

where M is either the first metal or the second metal, at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5;

At least a portion of the catalyst material may be comprised of the first metal, the second metal, and sulfur having a structure according to formula (X):

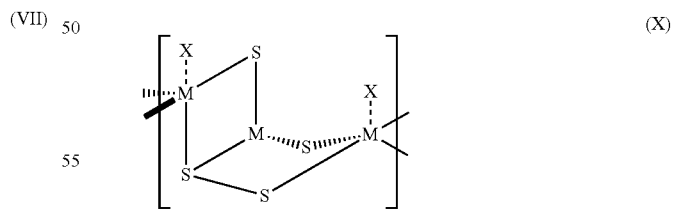
(X)

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$. The material of the catalyst as shown in formula (X) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal. The portion of the catalyst material comprised of the first metal, the second metal, and sulfur may also have a polymeric structure according to formula (XI):

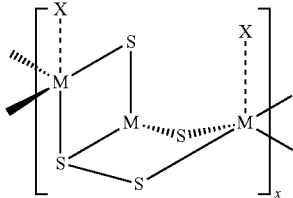

where M is either the first metal or the second metal, and at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5.

At least a portion of the catalyst material may be comprised of the first metal, the second metal, and sulfur having a structure according to formula (XII):

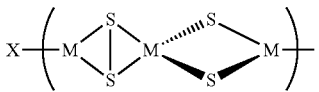

where M is either the first metal or the second metal, at least one M is the first metal and at least one M is the second metal, and X is selected from the group consisting of $SO_4$, $PO_4$, oxalate ($C_2O_4$), acetylacetonate, acetate, citrate, tartrate, Cl, Br, I, $ClO_4$, and $NO_3$.

For example, at least a portion of the catalyst material may have a structure in accordance with formula (XIII):

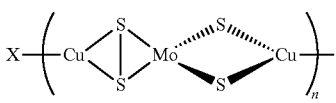

where X is selected from the group consisting of $SO_4$, $PO_4$, oxalate ($C_2O_4$), acetylacetonate, acetate, citrate, tartrate, Cl, Br, I, $ClO_4$, and $NO_3$, and n is an integer equal to or greater than 1. The catalyst material as shown in formula (XII) may include a third metal selected from the group consisting of Cu, Fe, Bi, Ag, Mn, Zn, Ni, Co, Sn, Re, Rh, Pd, Ir, Pt, Ce, La, Pr, Sm, Eu, Yb, Lu, Dy, Pb, Cd, Sb, and In, where the third metal is not the same as the first metal or the second metal, and where M is either the first metal, or the second metal, or the third metal, and at least one M is the first metal, at least one M is the second metal, and at least one M is the third metal. The portion of the catalyst material comprised of the first metal, the second metal, and sulfur may also have a polymeric structure according to formula (XIV):

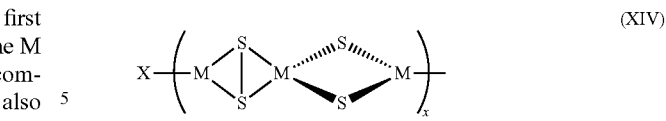

where M is either the first metal or the second metal, at least one M is the first metal and at least one M is the second metal, X is selected from the group consisting of $SO_4$, $PO_4$, oxalate ($C_2O_4$), acetylacetonate, acetate, citrate, tartrate, Cl, Br, I, $ClO_4$, and $NO_3$, and x is at least 2 and preferably is at least 5.

The material of a preferred non-acidic thiometallate catalyst for use in the hydrocracking step of the process of the present invention may contain less than 0.5 wt. % of ligands other than the sulfur-metal bonded complexes between sulfur and the first metal and between sulfur and the second metal. Ligands, other than the sulfur-metal bonded complexes with the first metal and the second metal, may not be present in significant quantities in the material since they may limit the particle size of the material of the catalyst to less than 50 nm, for example, by inhibiting the first metal and the second metal from forming sulfur-bridged chains.

The material of the non-acidic thiometallate catalyst may be tetrathiometallate material comprised of alternating $M^1S_4$ and $M^2S_4$ tetrahedral formations located adjacent to each other, where $M^1$ is the first metal and $M^2$ is the second metal as described above, and where the metal of each tetrahedral formation is bonded to at least two sulfur atoms that are also bonded to the metal of an adjacent tetrahedral formation. The tetrathiometallate material may have a polymeric structure wherein a portion of the first metal is located within interstices or holes in the polymeric structure, where the portion of the first metal located within interstices or holes in the polymeric structure is not bonded with a sulfur atom or second metal atom included in the polymeric structure.

A preferred non-acidic thiometallate catalyst for use in the hydrocracking step of the process of the present invention preferably is formed primarily of a material comprised of the first metal, second metal, and sulfur as described above, and the material of the preferred catalyst is formed primarily of the first metal, second metal, and sulfur as described above. The first metal, second metal, and sulfur may comprise at least 75 wt. %, or at least 80 wt. %, or at least 85 wt. %, or at least 90 wt. %, or at least 95 wt. %, or at least 99 wt. % or 100 wt. % of the material of the thiometallate catalyst structured as described above, where the material of the catalyst comprises at least 50 wt. % or at least 60 wt. %, or at least 70 wt. %, or at least 75 wt. %, or at least 80 wt. %, or at least 90 wt. %, or at least 95 wt. %, or at least 99 wt. % or 100 wt. % of the thiometallate catalyst.

The first metal may be present in the material of a preferred non-acidic thiometallate catalyst for use in the hydrocracking step of the process of the present invention in an atomic ratio relative to the second metal of at least 1:2. The atomic ratio of the first metal to the second metal in the material of the thiometallate catalyst, and/or in the thiometallate catalyst, may be greater than 1:2, or at least 2:3, or at least 1:1, or at least 2:1, or at least 3:1, or at least 5:1. It is believed that the first metal contributes significantly to the catalytic activity of the thiometallate catalyst in the hydrocracking step of the process of the present invention when the first metal is present in the material of the catalyst, and/or in the catalyst, in an amount relative to the second metal ranging from slightly less of the first metal to the second metal to significantly more of the first metal to the second metal. Therefore, the first metal may be incorporated in the material of the thiometallate catalyst, and/or in the catalyst, in an amount, relative to the second metal, such that the atomic ratio of the first metal to the second metal ranges from one half to significantly greater than one, such that the first metal is not merely a promoter of the second metal in the catalyst.

It is believed that the relatively non-acidic thiometallate catalyst is particularly effective for use in hydrocracking a heavy hydrocarbon-containing material in the process of the present invention due, in part, to the molecular structure of the catalyst, which facilitates donation or sharing of electrons as a Lewis base from the catalyst to a hydrocarbon or a hydrocarbon anion radical. The sulfur atoms linking the first and second metals in the catalyst may facilitate the electron donating/sharing activity of the catalyst, acting to enable charge transfer from the first metal to the second metal or from the second metal to the first metal across the molecular orbitals of the sulfur atoms, as well as potentially acting to directly share electrons from the sulfur atoms in the catalyst with the hydrocarbon or hydrocarbon anion radical. The sulfur atoms may further facilitate donation/sharing of electrons from the catalyst to a hydrocarbon or hydrocarbon anion radical by charge stabilization of the catalyst as the catalyst donates/shares electrons with a hydrocarbon or hydrocarbon anion radical. It is believed that the structure of the catalyst is particularly effective in facilitating donation or sharing of electrons from the catalyst to a hydrocarbon or hydrocarbon anion radical when the catalyst has a polythiometallate polymeric structure such as set forth in formulas (V) and (VI) above, particularly when x is at least 5, since any charge induced in the catalyst by sharing or donation of electrons to the hydrocarbon or hydrocarbon anion radical may be spread over a large number of sulfur atoms and first and second metals that form the polymeric structure of the catalyst.

A preferred non-acidic thiometallate catalyst may be particularly effective in the step of hydrocracking a heavy hydrocarbon-containing material since the molecular structure of the tetrathiometallate material may have sulfided electron-rich metals incorporated therein while inhibiting reduction of such electron-rich metals to a zero-oxidation state during the hydrocracking process. Use of sulfided electron-rich metals is typically avoided in hydrocarbon cracking processes since the metal of typical electron-rich metal compounds may be easily desulfided and reduced to its zero-oxidation state in the presence of hydrogen, and zero-oxidation state electron-rich metals catalyze the production of coke in a cracking process. For example, copper sulfide is an electron-rich metal that is not typically utilized in cracking processes due to its propensity to be desulfurized and thereafter catalyze coke formation. The molecular structure of a non-acidic thiometallate catalyst useful in the hydrocracking step of the process of the present invention, however, enables the use of an electron-rich metal such as copper or bismuth in the thiometallate catalyst, where electron-rich metals such as copper or bismuth are preferred for use as the first metal in the catalyst. The electron-rich metal may be bound in the catalyst by two sulfur atoms, inhibiting or preventing the reduction of the electron-rich metal to its zero-oxidation state, and thereby inhibiting or preventing the formation of coke by the zero-oxidation state electron-rich metal. Inclusion of an electron-rich metal, particularly copper, in the thiometallate catalyst material promotes the electron donation/sharing characteristics of the thiometallate catalyst material by increasing the electron density of the thiometallate catalyst material available to be donated or shared.

A preferred non-acidic metal-containing catalyst used in the catalytic hydrocracking step of the process of the present invention may contain little or no oxygen. The catalytic activity of the catalyst(s) in the hydrocracking step is, in part, believed to be due to the availability of electrons from the catalyst(s). Due to its electronegativity, oxygen tends to reduce the availability of electrons from a hydrocracking catalyst when it is present in the catalyst in appreciable quantities, therefore, each catalyst utilized in the hydrocracking step of the process of the present invention preferably contains little or no oxygen. Each catalyst utilized in the hydrocracking step of the process of the present invention may comprise at most 0.1 wt. %, or at most 0.05 wt. %, or at most 0.01 wt. % oxygen as measured by neutron activation. In a preferred embodiment, oxygen is not detectable in any catalyst utilized in the catalytic hydrocracking step of the process.

One or more of the non-acidic, preferably thiometallate, hydrocracking catalysts may be a solid particulate substance having a particle size distribution with a relatively small mean and/or median particle size, where the solid catalyst particles preferably are nanometer size particles. The catalyst may have a particle size distribution with a median particle size and/or mean particle size of at least 50 nm, or at least 75 nm, or up to 1 µm, or up to 750 nm; or up to 500 nm, or from 50 nm up to 1 µm. A solid particulate catalyst having a particle size distribution with a large quantity of small particles, for example having a mean and/or median particle size of up to 1 µm, has a large aggregate surface area since little of the catalytically active components of the catalyst are located within the interior of a particle. A particulate non-acidic, preferably thiometallic, catalyst having a particle size distribution with a large quantity of small particles, therefore, may be desirable for use in the catalytic hydrocracking step of the process of the present invention to provide a relatively high degree catalytic activity due to the surface area of the catalyst available for catalytic activity. A catalyst used in hydrocracking step of the process of the invention may be a solid particulate substance preferably having a particle size distribution with a mean particle size and/or median particle size of up to 1 µm, preferably having a pore size distribution with a mean pore diameter and/or a median pore diameter of from 50 to 1000 angstroms, or from 60 to 350 angstroms, preferably having a pore volume of at least 0.2 cm$^3$/g, or at least 0.25 cm$^3$/g or at least 0.3 cm$^3$/g, or at least 0.35 cm$^3$/g, or at least 0.4 cm$^3$/g, and preferably having a BET surface area of at least 50 m$^2$/g, or at least 100 m$^2$/g, and up to 400 m$^2$/g, or up to 500 m$^2$/g.

A solid particulate non-acidic metal-containing catalyst utilized in the hydrocracking step of the process of the present invention may be insoluble in the hydrocarbon-containing feedstock and in the hydrocarbon-depleted feed residuum formed in the hydrocracking step of the process. A solid particulate catalyst having a particle size distribution with a median and/or mean particle size of at least 50 nm may be insoluble in the hydrocarbon-containing feedstock and the hydrocarbon-depleted residuum due, in part, to the size of the particles, which may be too large to be solvated by the hydrocarbon-containing feed or the residuum. Use of a solid particulate catalyst which is insoluble in the hydrocarbon-containing feed and the hydrocarbon-depleted feed residuum may be desirable in the hydrocracking step of the process of the present invention so that the catalyst may be separated from the residuum formed by the process, and subsequently regenerated for reuse in the process.

Method of Preparing Preferred Non-Acidic Thiometallate Catalysts for Use in the Hydrocracking Step A non-acidic, Lewis basic, thiometallate catalyst material that may be utilized in the process of the present invention in the catalytic hydrocracking step—wherein the hydrocarbon-containing feedstock, the catalyst, and hydrogen are mixed at a temperature of 375° C. to 500° C. and a pressure of 6.9 MPa to 27.5 MPa—may be prepared by mixing a first salt and a second salt in an aqueous mixture under anaerobic conditions at a temperature of from 15° C. to 150° C., and separating a solid from the aqueous mixture to produce the catalyst material.

The first salt that may be utilized to form a thiometallate hydrocracking catalyst material includes a cationic component comprising a metal in any non-zero oxidation state selected from the group consisting of Cu, Fe, Ni, Co, Bi, Ag, Mn, Zn, Sn, Ru, La, Ce, Pr, Sm, Eu, Yb, Lu, Dy, Pb, and Sb, where the metal of the cationic component is the first metal of the material of the thiometallate catalyst. The cationic component of the first salt may consist essentially of a metal selected from the group consisting of Cu, Fe, Bi, Ni, Co, Ag, Mn, Zn, Sn, Ru, La, Ce, Pr, Su, Eu, Yb, Lu, Dy, Pb, and Sb. The cationic component of the first salt must be capable of bonding with the anionic component of the second salt to form the material of the thiometallate catalyst in the aqueous mixture at a temperature of from 15° C. to 150° C. under anaerobic conditions.

The first salt also contains an anionic component associated with the cationic component of the first salt to form the first salt. The anionic component of the first salt may be selected from a wide range of counterions to the cationic component of the first salt so long as the combined cationic component and the anionic component of the first salt form a salt that is dispersible, and preferably soluble, in the aqueous mixture in which the first salt and the second salt are mixed, and so long as the anionic component of the first salt does not prevent the combination of the cationic component of the first salt with the anionic component of the second salt in the aqueous mixture to form the material of the thiometallate catalyst. The anionic component of the first salt may be selected from the group consisting of sulfate, chloride, bromide, iodide, acetate, acetylacetonate, oxalate, citrate, tartrate, and mixtures thereof.

Certain compounds are preferred for use as the first salt to form the thiometallate catalyst material. In particular, the first salt is preferably selected from the group consisting of $CuSO_4$, copper acetate, copper acetylacetonate, $FeSO_4$, $Fe_2(SO_4)_3$, iron acetate, iron acetylacetonate, $NiSO_4$, nickel acetate, nickel acetylacetonate, $CoSO_4$, cobalt acetate, cobalt acetylacetonate, $ZnCl_2$, $ZnSO_4$, zinc acetate, zinc acetylacetonate, silver acetate, silver acetylacetonate, $SnSO_4$, $SnCl_4$, tin acetate, tin acetylacetonate, $MnSO_4$, manganese acetate, manganese acetylacetonate, bismuth acetate, bismuth acetylacetonate, and hydrates thereof. These materials are generally commercially available, or may be prepared from commercially available materials according to well-known methods.

The first salt may be contained in an aqueous solution or an aqueous mixture, where the aqueous solution or aqueous mixture containing the first salt (hereinafter the "first aqueous solution") may be mixed with an aqueous solution or an aqueous mixture containing the second salt (hereinafter the "second aqueous solution") to form the material of the preferred catalyst. The first salt may be dispersible, and most preferably soluble, in the first aqueous solution and is dispersible, and preferably soluble, in the aqueous mixture of the first and second salts. The first aqueous solution may contain more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons selected from the group consisting of an alcohol, a diol, an aldehyde, a ketone, an amine, an amide, a furan, an ether, acetonitrile, and mixtures thereof. The organic solvent present in the first aqueous solution, if any, should be selected so that the organic compounds in the organic solvent do not inhibit reaction of the cationic component of the first salt with the anionic component of the second salt upon forming an aqueous mixture containing the first and second salts, e.g., by forming ligands or by reacting with the first or second salts or their respective cationic or anionic components. The first aqueous solution may contain no organic solvent, and may consist essentially of water, preferably deionized water, and the first salt.

The concentration of the first salt in the first aqueous solution may be selected to promote formation of a thiometallate catalyst material having a particle size distribution with a small mean and/or median particle size—where the particles have a relatively large surface area—upon mixing the first salt and the second salt in an aqueous mixture. To promote the formation of a catalyst material having a relatively large surface area and having a particle size distribution with a relatively small mean and/or median particle size, the first aqueous solution may contain at most 3 moles per liter, or at most 2 moles per liter, or at most 1 mole per liter, or at most 0.6 moles per liter, or at most 0.2 moles per liter of the first salt.

The second salt utilized to form a thiometallate catalyst material may include an anionic component that is a tetrathiometallate of molybdenum, tungsten, tin or antimony. In particular, the second salt may contain an anionic component that is selected from the group consisting of $MoS_4^{2-}$, $WS_4^{2-}$, $SnS_4^{4-}$, $SbS_4^{3-}$, and mixtures thereof.

The second salt also contains a cationic component associated with the anionic component of the second salt to form the second salt. The cationic component of the second salt may be selected from an ammonium counterion, an alkali metal counterion, and/or an alkaline earth metal counterion to the tetrathiometallate anionic component of the second salt so long as the combined cationic component and the anionic component of the second salt form a salt that is dispersable, and preferably soluble, in an aqueous mixture of the first salt and the second salt, and so long as the cationic component of the second salt does not prevent the combination of the cationic component of the first salt with the anionic component of the second salt in the aqueous mixture to form the thiometallate catalyst material. The cationic component of the second salt may comprise one or more sodium ions, or one or more potassium ions, or one or more ammonium ions.

Certain compounds are preferred for use as the second salt used to form a thiometallate catalyst material. In particular, the second salt may be selected from the group consisting of $Na_2MoS_4$, $Na_2WS_4$, $K_2MoS_4$, $K_2WS_4$, $(NH_4)_2MoS_4$, $(NH_4)_2WS_4$, $Na_4SnS_4$, $(NH_4)_4SnS_4$, $(NH_4)_3SbS_4$, $Na_3SbS_4$, and hydrates thereof.

The second salt may be a commercially available tetrathiomolybdate or tetrathiotungstate salt. For example, the second salt may be ammonium tetrathiomolybdate, which is commercially available from AAA Molybdenum Products, Inc. 7233 W. 116 Pl., Broomfield, Colo., USA 80020, or ammonium tetrathiotungstate, which is commercially available from Sigma-Aldrich, 3050 Spruce St., St. Louis, Mo., USA 63103.

Alternatively, the second salt may be produced from a commercially available tetrathiomolybdate or tetrathiotungstate salt. For example, the second salt may be produced from ammonium tetrathiomolybdate or from ammonium tetrathiotungstate. The second salt may be formed from the commercially available ammonium tetrathiometallate salts by exchanging the cationic ammonium component of the commercially available salt with a desired alkali or alkaline earth cationic component from a separate salt. The exchange of the cationic components to form the desired second salt may be effected by mixing the commercially available salt and the salt containing the desired cationic component in an aqueous solution to form the desired second salt.

A method of forming the second salt is to disperse ammonium tetrathiomolybdate or ammonium tetrathiotungstate in an aqueous solution, preferably water, and to disperse an alkali metal or alkaline earth metal cationic component donor salt, preferably a carbonate, in the aqueous solution, where the cationic component donor salt is provided in an amount relative to the ammonium tetrathiomolybdate or ammonium tetrathiotungstate salt to provide a stoichiometrially equivalent or greater amount of its cation to ammonium of the ammonium tetrathiomolybdate or ammonium tetrathiotungstate salt. The aqueous solution may be heated to a temperature of at least 50° C., or at least 65° C. up to 100° C. to evolve ammonia from the ammonium containing salt and carbon dioxide from the carbonate containing salt as gases, and to form the second salt. For example a $Na_2MoS_4$ salt may be prepared for use as the second salt by mixing commercially available $(NH_4)_2MoS_4$ and $Na_2CO_3$ in water at a temperature of 70° C.-80° C. for a time period sufficient to permit evolution of a significant amount, preferably substantially all, of ammonia and carbon dioxide gases from the solution, typically from 30 minutes to 4 hours, and usually about 2 hours.

If the second salt is a sodium tetrathiostannate salt, it may be produced by dissolving $Na_2Sn(OH)_6$ and $Na_2S$ in a 1:4 molar ratio in boiling deionized water (100 g of $Na_2Sn(OH)_6$ per 700 ml of water and 250 g of $Na_2S$ per 700 ml of water), stiffing the mixture at 90-100° C. for 2-3 hours, adding finely pulverized MgO to the mixture at a 2:5 wt. ratio relative to the $Na_2Sn(OH)_6$ and continuing stiffing the mixture at 90-100° C. for an additional 2-3 hours, cooling and collecting precipitated impurities from the mixture, then concentrating the remaining solution by 50-60 vol. %, allowing the concentrated solution to stand, then collecting the $Na_4SnS_4$ that crystallizes from the concentrated solution. An ammonium tetrathiostannate salt may be produced by mixing $SnS_2$ with $(NH_4)_2S$ in a 1:2 mole ratio in liquid ammonia under an inert gas (e.g. nitrogen), filtering, and recovering the solid $(NH_4)_4SnS_4$ as a residue.

The second salt may be contained in an aqueous solution (the second aqueous solution, as noted above), where the second aqueous solution containing the second salt may be mixed with the first aqueous solution containing the first salt in an aqueous mixture to form the thiometallate catalyst. The second salt is preferably dispersible, and most preferably soluble, in the second aqueous solution and is dispersible, and preferably soluble, in an aqueous mixture containing the first and second salts. The second aqueous solution may contain more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the second aqueous solution, if any, should be selected so that the organic compounds in the organic solvent do not inhibit reaction of the cationic component of the first salt with the anionic component of the second salt upon forming an aqueous mixture containing the first and second salts, e.g., by forming ligands or by reacting with the first or second salts or their respective cationic or anionic components. The second aqueous solution may contain no organic solvent. The second aqueous solution may consist essentially of water, preferably deionized, and the second salt.

The concentration of the second salt in the second aqueous solution may be selected to promote formation of a thiometallate catalyst having a particle size distribution with a small mean and/or median particle size and having a relatively large surface area per particle upon mixing the first salt and the second salt in an aqueous mixture. To promote the formation of a thiometallate catalyst material having a particle size distribution with a relatively small mean and/or median particle size, the second aqueous solution may contain at most 0.8 moles per liter, or at most 0.6 moles per liter, or at most 0.4 moles per liter, or at most 0.2 moles per liter, or at most 0.1 moles per liter of the second salt.

The first and second solutions containing the first and second salts, respectively, may be mixed in an aqueous mixture to form the thiometallate catalyst. The amount of the first salt relative to the amount of the second salt provided to the aqueous mixture may be selected so that the atomic ratio of the cationic component metal of the first salt to the metal of the anionic component of the second salt is at least 1:2, or at least 2:3, or at least 1:1, and at most 20:1, or at most 15:1, or at most 10:1.

The aqueous mixture containing the first salt and the second salt may be mixed to facilitate interaction and reaction of the cationic component of the first salt with the anionic component of the second salt to form the catalyst material. The aqueous mixture may be mixed by any conventional means for agitating an aqueous solution or an aqueous dispersion, for example by mechanical stiffing.

During mixing of the aqueous mixture of the first and second salts, the temperature of the aqueous mixture may be maintained in the range of from 15° C. to 150° C., or from 60° C. to 125° C., or from 65° C. to 100° C. When the cationic component of the second salt is ammonium, the temperature should be maintained in a range from 65° C. to 150° C. to evolve ammonia as a gas from the second salt. The temperature of the aqueous mixture during mixing may be maintained at less than 100° C. so that the mixing may be conducted without the application of positive pressure necessary to inhibit the water in the aqueous mixture from becoming steam. If the second salt is a tetrathiostannate, the temperature of the aqueous mixture may be maintained at 100° C. or less to inhibit the degradation of the second salt into tin disulfides.

The first and second salts in the aqueous mixture may be mixed under a pressure of from 0.101 MPa to 10 MPa (1.01 bar to 100 bar). The first and second salts in the aqueous mixture may mixed at atmospheric pressure, however, if the mixing is effected at a temperature greater than 100° C. the mixing may be conducted under positive pressure to inhibit the formation of steam.

During mixing, the aqueous mixture of the first and second salts may be maintained under anaerobic conditions. Maintaining the aqueous mixture under anaerobic conditions during mixing inhibits the oxidation of the thiometallate catalyst material or the anionic component of the second salt so that the thiometallate catalyst material produced by the process contains little, if any oxygen. The aqueous mixture of the first and second salts may be maintained under anaerobic conditions during mixing by conducting the mixing in an atmosphere containing little or no oxygen, preferably an inert atmosphere. The mixing of the first and second salts in the aqueous mixture may be conducted under nitrogen gas, argon gas, and/or steam to maintain anaerobic conditions during the mixing. An inert gas, preferably nitrogen gas or steam, may be continuously injected into the aqueous mixture during mixing to maintain anaerobic conditions and to facilitate mixing of the first and second salts in the aqueous mixture and displacement of ammonia gas if the second salt contains an ammonium cation.

The first and second salts may be mixed in the aqueous mixture at a temperature of from 15° C. to 150° C. under anaerobic conditions for a period of time sufficient to permit the formation of the thiometallate catalyst material. The first and second salts may be mixed in the aqueous mixture for a period of at least 1 hour, or at least 2 hours, or at least 3 hours, or at least 4 hours, or from 1 hour to 10 hours, or from 2 hours to 9 hours, or from 3 hours to 8 hours, or from 4 hours to 7 hours to form the thiometallate catalyst material. The first and/or second salt(s) may be added to the aqueous mixture over a period of from 30 minutes to 4 hours while mixing the aqueous mixture, and, after the entirety of the first and second salts have been mixed into the aqueous mixture, the aqueous mixture may be mixed for at least an additional 1 hour, or 2 hours, or 3 hours or 4 hours, or 5 hours to form the thiometallate catalyst material.

After completing mixing of the aqueous mixture of the first and second salts, a solid may be separated from the aqueous mixture to produce the thiometallate catalyst material. The solid may be separated from the aqueous mixture by any conventional means for separating a solid phase material from a liquid phase material. For example, the solid may be separated by allowing the solid to settle from the resulting mixture, preferably for a period of from 1 hour to 16 hours, and separating the solid from the mixture by vacuum or gravitational filtration or by centrifugation. To enhance recovery of the solid, water may be added to the aqueous mixture prior to allowing the solid to settle. Water may be added to the aqueous mixture in a volume relative to the volume of the aqueous mixture of from 0.1:1 to 0.75:1. Alternatively, but less preferably, the solid may be separated from the mixture by centrifugation without first allowing the solid to settle and/or without the addition of water. The solid may also be separated from the mixture by spray drying the mixture to produce the catalyst.

The thiometallate catalyst material may be washed subsequent to separation from the aqueous mixture, if desired. The separated material of the catalyst may be contaminated with minor amounts, typically less than 0.5 wt. %, of the anionic component from the first salt and/or the cationic component from the second salt. These minor contaminants may be removed from the separated material of the catalyst by washing the separated material with water. Substantial volumes of water may be used to wash the separated catalyst material since the separated catalyst material is insoluble in water, and the yield of catalyst material will not be significantly affected by the wash.

The resulting thiometallate catalyst material has little or no acidity as determined by ammonia chemisorption. Typically, the thiometallate catalyst material will have an acidity as measured by ammonia chemisorption of from 0 to 100 μmol ammonia per gram of catalyst.

Mixing the Hydrocarbon-Containing Feedstock, Catalyst, Hydrogen, and Hydrogen Sulfide to Hydrocrack Feedstock In the process of the present invention, at least one non-acidic metal-containing catalyst, preferably a Lewis basic thiometallate catalyst as described above, the hydrocarbon-containing feedstock, hydrogen, and hydrogen sulfide are mixed, preferably blended, at a temperature of from 375° C. to 500° C. and a pressure of 6.9 MPa to 27.5 MPa to hydrocrack the hydrocarbon-containing feedstock. The hydrocarbon-containing feedstock, the non-acidic metal-containing catalyst, hydrogen, and hydrogen sulfide may be mixed by contact with each other in a mixing zone maintained at a temperature of from 375° C. to 500° C. and a pressure of 6.9 MPa to 27.5 MPa. A vapor that comprises hydrocarbons that are a gas at the temperature and pressure within the mixing zone and a hydrocarbon-containing feed residuum comprising hydrocarbons that are liquid at the temperature and pressure within the mixing zone are produced as a result of mixing the non-acidic metal-containing catalyst, the hydrocarbon-containing feedstock, hydrogen, and hydrogen sulfide at a temperature of from 375° C. to 500° C. and a pressure of 6.9 MPa to 27.5 MPa. The vapor is comprised of the first hydrocarbon-containing product, where the first hydrocarbon-containing product comprises hydrocarbons that are liquid at STP. The vapor may also comprise hydrogen, hydrogen sulfide, and hydrocarbons that are gaseous at STP.

In an embodiment of the process of the invention, as shown in FIG. 1, the mixing zone 1 may be in a reactor 3, where the conditions of the reactor 3 may be controlled to maintain the temperature and pressure in the mixing zone 1 at 375° C. to 500° C. and 6.9 MPa to 27.5 MPa, respectively. The hydrocarbon-containing feedstock may be provided continuously or intermittently from a feed supply 2 to the mixing zone 1 in the reactor 3 through feed inlet 5. The hydrocarbon-containing feedstock may be preheated to a temperature of from 100° C. to 350° C. by a heating element 4, which may be a heat exchanger, prior to being fed to the mixing zone 1.

The hydrocarbon-containing feedstock may be provided to the mixing zone 1 of the reactor 3 at a rate effective to maintain a mixture volume in the reactor 3 of from 5% to 97% of the volume of the reactor 3. The mixture volume is defined herein as the combined volume of the metal-containing catalyst, the hydrocarbon-depleted feed residuum (as defined herein), and the hydrocarbon-containing feedstock in the mixing zone 1, where the hydrocarbon-depleted feed residuum may contribute no volume to the mixture volume (i.e. at the start of the process before a hydrocarbon-depleted feed residuum has been produced in the mixing zone 1), and where the hydrocarbon-containing feedstock may periodically contribute no volume to the mixture volume (i.e. after initiation of the process during a period between intermittent addition of fresh hydrocarbon-containing feedstock into the mixing zone 1). The hydrocarbon-containing feedstock may be provided to the mixing zone 1 of the reactor 3 at a rate of greater than 300, or at least 400, or at least 500, or at least 600, or at least 700, or at least 800, or at least 900, or at least 1000 kg/hr per $m^3$ of the mixture volume within the mixing zone 1 up to 5000 kg/hr per $m^3$ of the mixture volume within the mixing zone 1.

The mixture volume within the mixing zone 1 may be affected by 1) the rate of addition of the hydrocarbon-containing feedstock into the mixing zone 1; 2) the rate of removal of the vapor from the reactor 3; and 3) the rate at which a bleed stream of the hydrocarbon-depleted feed residuum, metal-containing catalyst, and hydrocarbon-containing feedstock is separated from and recycled to the reactor 3, as described in further detail below. The mixture volume of the hydrocarbon-containing feedstock, the hydrocarbon-depleted feed residuum, and the non-acidic metal-containing catalyst may be maintained within the mixing zone within a selected range of the reactor volume by selecting 1) the rate at which the hydrocarbon-containing feedstock is provided to the mixing zone 1; and/or 2) the rate at which a bleed stream is removed from and recycled to the mixing zone 1; and/or 3) the temperature and pressure within the mixing zone 1 and the reactor 3 to provide a selected rate of vapor removal from the mixing zone 1 and the reactor 3. The combined volume of the hydrocarbon-containing feedstock and the metal-containing catalyst initially provided to the mixing zone 1 at the start of the process define an initial mixture volume, and the amount of hydrocarbon-containing feedstock and the amount of the catalyst initially provided to the mixing zone 1 may be selected to provide an initial mixture volume of from 5% to 97% of the reactor volume, preferably from 30% to 75% of the reactor volume. The rate at which the hydrocarbon-containing feedstock is provided to the mixing zone 1 and/or the rate at which a bleed stream is removed from and recycled to the mixing zone 1 and/or the rate at which vapor is removed from the reactor 3 may be selected to maintain the mixture volume of the hydrocarbon-containing feedstock, the hydrocarbon-depleted feed residuum, and the metal-containing catalyst at a level of at least 10%, or at least 25%, or at least 40%, or at least 50%, or within 70%, or within 50%, or from 10% to 250%, or from 25% to 200%, or from 50% to 150% of the initial mixture volume during the hydrocracking step of the process.

Hydrogen is provided to the mixing zone 1 of the reactor 3 for mixing or blending with the hydrocarbon-containing feedstock, hydrogen sulfide, and the non-acidic metal-containing catalyst. Hydrogen may be provided continuously or intermittently to the mixing zone 1 of the reactor 3 through hydrogen inlet line 7, or, alternatively, may be mixed together with the hydrocarbon-containing feedstock, and optionally the metal-containing catalyst, and provided to the mixing zone 1 through the feed inlet 5. Hydrogen may be provided to the mixing zone 1 of the reactor 3 at a rate sufficient to hydrogenate hydrocarbons cracked in the process. The hydrogen may be provided to the mixing zone 1 in a ratio relative to the hydrocarbon-containing feedstock provided to the mixing zone 1 of from 1 $Nm^3/m^3$ to 16,100 $Nm^3/m^3$ (5.6 SCFB to 90160 SCFB), or from 2 $Nm^3/m^3$ to 8000 $Nm^3/m^3$ (11.2 SCFB to 44800 SCFB), or from 3 $Nm^3/m^3$ to 4000 $Nm^3/m^3$ (16.8 SCFB to 22400 SCFB), or from 5 $Nm^3/m^3$ to 320 $Nm^3/m^3$ (28 SCFB to 1792 SCFB). The pressure in the mixing zone 1 may be maintained in a pressure range of from 6.9 MPa to 27.5 MPa (1000-4000 psi) or from 10.3 MPa to 17.2 MPa (1500-2500 psi), where the hydrogen partial pressure may be maintained in a pressure range of from 3.4 MPa to 25 MPa.

Hydrogen sulfide is also provided to be mixed, and preferably blended, with the hydrocarbon-containing feedstock, hydrogen, any hydrocarbon-depleted feed residuum, and the non-acidic metal-containing catalyst in the mixing zone 1 of the reactor 3. The hydrogen sulfide may be provided continuously or intermittently to the mixing zone 1 of the reactor 3 as a liquid or a gas. The hydrogen sulfide may be mixed with the hydrocarbon-containing feedstock and provided to the mixing zone 1 with the hydrocarbon-containing feedstock through the feed inlet 5. Alternatively, the hydrogen sulfide may be mixed with hydrogen and provided to the mixing zone 1 through the hydrogen inlet line 7. Alternatively, the hydrogen sulfide may be provided to the mixing zone 1 through a hydrogen sulfide inlet line 27.

It is believed that the hydrogen sulfide acts as a further catalyst in cracking hydrocarbons in the hydrocarbon-containing feedstock in the presence of hydrogen and the non-acidic metal-containing catalyst and inhibits coke formation and formation of refractory sulfur and nitrogen compounds under cracking conditions. Use of sufficient hydrogen sulfide in the hydrocracking step of the process permits the hydrocracking to be effected at a mixing zone temperature of at least at least 430° C. or at least 450° C. with little or no increase in coke formation and/or refractory sulfur and/or nitrogen compound formation relative to cracking conducted at lower temperatures since hydrogen sulfide inhibits coke and refractory sulfur and/or nitrogen compound formation. The rate of the process, in particular the rate that the hydrocarbon-containing feedstock may be provided to the mixing zone 1 for cracking and the vapor containing the first hydrocarbon-containing product may be removed from the reactor 3, therefore, may be greatly increased with the use of significant quantities of hydrogen sulfide in the hydrocracking mixture since the rate of reaction in the process increases significantly relative to temperature.

The hydrogen sulfide provided to be mixed with the hydrocarbon-containing feedstock, hydrogen, and the non-acidic metal-containing catalyst may be provided in an amount effective to demonstrate a catalytic effect by increasing the rate of the cracking reaction. In order to increase the rate of the cracking reaction, hydrogen sulfide may be provided in an amount on a mole ratio basis relative to hydrogen provided to be mixed with the hydrocarbon-containing feedstock and catalyst of at least 1 mole of hydrogen sulfide per 10 moles hydrogen. The hydrogen sulfide may be provided in an amount on a mole ratio basis relative to the hydrogen provided of at least 1.5:10.0, or at least 1.0:5.0, or at least 1.0:4.0, or at least 3.0:10.0, or at least 2.0:5.0.

One or more of the non-acidic metal-containing catalysts, preferably one or more thiometallate catalyst as described above, may be located in the mixing zone 1 in the reactor 3 or may be provided to the mixing zone 1 in the reactor 3 in the hydrocracking step of the process of the present invention. The metal-containing catalyst provided for mixing in the mixing zone 1 of the reactor 3 has an acidity as measured by ammonia chemisorption of at most 500 μmol ammonia desorbed from the catalyst per gram of catalyst, or at most 200, or at most 100, or at most 50, or at most 10, or at most 5 μmol ammonia desorbed from the catalyst per gram of catalyst, and, most preferably 0 μmol ammonia desorbed from the catalyst per gram of catalyst.

The non-acidic metal-containing catalyst may be located in the mixing zone 1 in a catalyst bed. More preferably, the non-acidic metal-containing catalyst may be provided to the mixing zone 1 during the process, or, if located in the mixing zone initially, may be blended with the hydrocarbon-containing feed, hydrogen, and hydrogen sulfide, and is not present in a catalyst bed. The non-acidic metal-containing catalyst may be provided to the mixing zone 1 together with the hydrocarbon-containing feedstock through feed inlet 5, where the catalyst may be dispersed in the hydrocarbon-containing feedstock prior to feeding the mixture to the mixing zone 1 through the feed inlet 5. Alternatively, the non-acidic metal-containing catalyst may be provided to the mixing zone 1 through a catalyst inlet 9, where the catalyst may be mixed with sufficient hydrocarbon-containing feedstock or another fluid, for example a hydrocarbon-containing fluid, to enable the catalyst to be delivered to the mixing zone 1 through the catalyst inlet 9.

The non-acidic metal-containing catalyst may be provided to be mixed with the hydrocarbon-containing feedstock, hydrogen, and hydrogen sulfide in the mixing zone 1 in a sufficient amount to catalytically crack the hydrocarbon-containing feedstock and/or to catalyze hydrogenation of the cracked hydrocarbons in the mixing zone. An initial charge of the non-acidic metal-containing catalyst may be provided for mixing with an initial charge of hydrocarbon-containing feedstock in an amount of from 20 grams to 125 grams of catalyst per kilogram of initial hydrocarbon-containing feedstock. Over the course of the process, the non-acidic metal-containing catalyst may be provided for mixing with the hydrocarbon-containing feedstock, hydrogen, and hydrogen sulfide in an amount of from 0.125 grams to 5 grams of catalyst per kilogram of hydrocarbon-containing feedstock. Alternatively, the non-acidic metal-containing catalyst may be provided for mixing with the hydrocarbon-containing feedstock, hydrogen, and hydrogen sulfide over the course of the process in an amount of from 0.125 grams to 50 grams of catalyst per kilogram of hydrocarbons in the hydrocarbon-containing feedstock having a boiling point of at least 538° C. as determined in accordance with ASTM Method D5307.

The non-acidic metal-containing catalyst, the hydrocarbon-containing feedstock, hydrogen, and hydrogen sulfide may be mixed by being blended into an intimate admixture in the mixing zone 1. The metal-containing catalyst, hydrocarbon-containing feedstock, hydrogen, and hydrogen sulfide may be blended in the mixing zone 1, for example, by stirring a mixture of the components, for example by a mechanical stiffing device located in the mixing zone 1. The metal-containing catalyst, hydrocarbon-containing feedstock, hydrogen, and hydrogen sulfide may also be mixed in the mixing zone 1 by blending the components prior to providing the components to the mixing zone 1 and injecting the blended components into the mixing zone 1 through one or more nozzles which may act as the feed inlet 5. The metal-containing catalyst, hydrocarbon-containing feedstock, hydrogen, and hydrogen sulfide may also be blended in the mixing zone 1 by blending the hydrocarbon-containing feedstock and catalyst and injecting the mixture into the mixing zone 1 through one or more feed inlet nozzles positioned with respect to the hydrogen inlet line 7 such that the mixture is blended with hydrogen entering the mixing zone 1 through the hydrogen inlet line 7. Baffles may be included in the reactor 3 in the mixing zone 1 to facilitate blending the hydrocarbon-containing feedstock, catalyst, hydrogen, and hydrogen sulfide. Less preferably, the non-acidic metal-containing catalyst is present in the mixing zone 1 in a catalyst bed, and the hydrocarbon-containing feedstock, hydrogen, hydrogen sulfide, and catalyst are mixed by bringing the hydrocarbon-containing feedstock, hydrogen, and hydrogen sulfide simultaneously into contact with the catalyst in the catalyst bed.

The temperature and pressure conditions in the mixing zone 1 are maintained so that heavy hydrocarbons in the hydrocarbon-containing feedstock may be cracked. The temperature in the mixing zone 1 is maintained from 375° C. to 500° C. Preferably, the mixing zone 1 is maintained at a temperature of from 425° C. to 500° C., or from 430° C. to 500° C., or from 440° C. to 500° C., or from 450° C. to 500° C. In an embodiment of the process of the present invention, the temperature within the mixing zone is selected and controlled to be at least 430° C., or at least 450° C. Higher temperatures may be preferred in the hydrocracking step of the process of the present invention since 1) the rate of conversion of the hydrocarbon-containing feedstock to the vapor containing the first hydrocarbon-containing product increases with temperature; and 2) the hydrocracking step of the present process inhibits or prevents the formation of coke, even at temperatures of 450° C. or greater, which typically occurs rapidly in conventional cracking processes at temperatures of 430° C. or greater.

Mixing the hydrocarbon-containing feedstock, the non-acidic metal-containing catalyst, hydrogen, and hydrogen sulfide in the mixing zone 1 at a temperature of from 375° C. to 500° C. and a pressure of from 6.9 MPa to 27.5 MPa produces a vapor that is comprised of hydrocarbons that are vaporizable at the temperature and pressure within the mixing zone 1 which includes the first hydrocarbon-containing product. The vapor may be comprised of hydrocarbon compounds present initially in the hydrocarbon-containing feedstock that vaporize at the temperature and pressure within the mixing zone 1 and hydrocarbon compounds that are not present initially in the hydrocarbon-containing feedstock but are produced by cracking and hydrogenating hydrocarbon compounds initially in the hydrocarbon-containing feedstock that were not vaporizable at the temperature and pressure within the mixing zone 1. The vapor may also be comprised of hydrocarbons that are gaseous at STP, hydrogen, and hydrogen sulfide. At least a portion of the vapor comprised of hydrocarbons that are vaporizable at the temperature and pressure within the mixing zone 1 may be continuously or intermittently separated from the mixing zone 1 since the more volatile vapor physically separates from the mixture in the mixing zone 1.

Separation of the vapor from the mixture in the mixing zone 1 leaves a hydrocarbon-depleted feed residuum from which the hydrocarbons present in the vapor have been removed. The hydrocarbon-depleted feed residuum is comprised of hydrocarbons that are liquid at the temperature and pressure within the mixing zone 1. The hydrocarbon-depleted feed residuum may also be comprised of solids such as metals freed from cracked hydrocarbons and minor amounts of coke. The hydrocarbon-depleted feed residuum may contain little coke or proto-coke since the hydrocracking step of the process of the present invention inhibits the generation of substantial quantities of coke. The hydrocarbon-depleted feed residuum may contain, per metric ton of hydrocarbon feedstock provided to the mixing zone 1, less than 30 kg, or at most 20 kg, or at most 10 kg, or at most 5 kg of hydrocarbons insoluble in toluene as measured by ASTM Method D4072.

At least a portion of the hydrocarbon-depleted feed residuum is retained in the mixing zone 1 while the vapor is separated from the mixing zone 1. The portion of the hydrocarbon-depleted feed residuum retained in the mixing zone 1 may be subject to further cracking to produce more vapor that may be separated from the mixing zone 1 and then from the reactor 3. Hydrocarbon-containing feedstock, hydrogen, and hydrogen sulfide may be continuously or intermittently provided to the mixing zone 1 at the rates described above and mixed with the non-acidic metal-containing catalyst and the hydrocarbon-depleted feed residuum retained in the mixing zone 1 to produce further vapor comprised of hydrocarbons that are vaporizable at the temperature and pressure within the mixing zone 1 for separation from the mixing zone 1 and the reactor 3.

At least a portion of the vapor separated from the mixing zone 1 may be continuously or intermittently separated from the reactor 3 through a reactor product outlet 11 to provide the first hydrocarbon-containing product. The reactor 3 is preferably configured and operated so that substantially only vapors and gases may exit the reactor product outlet 11, where the vapor product exiting the reactor 3 comprises at most 5 wt. %, or at most 3 wt. %, or at most 1 wt. %, or at most 0.5 wt. %, or at most 0.1 wt. %, or at most 0.01 wt. %, or at most 0.001 wt. % solids and liquids at the temperature and pressure at which the vapor product exits the reactor 3.

A stripping gas may be injected into the reactor 3 over the mixing zone 1 to facilitate separation of the vapor containing the first hydrocarbon-containing product from the mixing zone 1 and from the reactor 3. The stripping gas may be heated to a temperature at or above the temperature within the mixing zone 1 to assist in separating the vapor from the mixing zone 1. The stripping gas may be hydrogen gas and/or hydrogen sulfide gas.

The hydrocarbons in the hydrocarbon-containing feed and hydrocarbon-containing feed residuum may be contacted and mixed with the non-acidic metal-containing catalyst, hydrogen, and hydrogen sulfide in the mixing zone 1 of the reactor 3 only as long as necessary to be vaporized and separated from the mixture, and are retained in the reactor 3 only as long as necessary to be vaporized and exit the reactor product outlet 11. Low molecular weight hydrocarbons having a low boiling point may be vaporized and separated from the mixing zone 1 almost immediately upon being introduced into the mixing zone 1 when the mixing zone 1 is maintained at a temperature of 375° C. to 500° C. and a pressure of from 6.9 MPa to 27.5 MPa. These hydrocarbons may be separated rapidly from the reactor 3 in the vapor. High molecular weight hydrocarbons having a high boiling point, for example hydrocarbons having a boiling point greater than 538° C. (1000° F.) at 0.101 MPa, may remain in the mixing zone 1 until they are cracked into hydrocarbons having a boiling point low enough to be vaporized at the temperature and pressure in the mixing zone 1 and to separate from the mixing zone and exit the reactor 3. The hydrocarbons of the hydrocarbon-containing feed, therefore, may be contacted and mixed with the metal-containing catalyst, hydrogen, and hydrogen sulfide in the mixing zone 1 of the reactor 3 for a variable time period, depending on the boiling point of the hydrocarbons under the conditions in the mixing zone 1 and the reactor 3.

The rate of producing the vapor comprising the first hydrocarbon containing-product from the hydrocarbon-containing feedstock may be adjusted by selection of the temperature and/or pressure in the reactor 3, and particularly in the mixing zone 1, within the temperature range of 375° C.-500° C. and within the pressure range of 6.9 MPa-27.5 MPa. Increasing the temperature and/or decreasing the pressure in the mixing zone 1 permits the hydrocarbon-containing feedstock to be provided to the mixing zone 1 of the reactor 3 at an increased rate and permits the vapor to be separated from the mixing zone 1 and the reactor 3 at an increased rate since the hydrocarbons in the hydrocarbon-containing feedstock may experience a decreased residence time in the reactor 3 due to higher cracking activity and/or increased volatility. Conversely, decreasing the temperature and/or increasing the pressure in the mixing zone 1 may reduce the rate at which the hydrocarbon-containing feedstock may be provided to the reactor 3 and the vapor may be separated and removed from mixing zone 1 and the reactor 3 since the hydrocarbons in the hydrocarbon-containing feedstock may experience an increased residence time in the reactor 3 due to lower cracking activity and/or decreased volatility.

As a result of the inhibition and/or prevention of the formation of coke in the hydrocracking step of the process of the present invention, the hydrocarbons in the hydrocarbon-containing feed may be contacted and mixed with the non-acidic metal-containing catalyst, hydrogen, and hydrogen sulfide in the mixing zone 1 at a temperature of 375° C. to 500° C. and a pressure of 6.9 MPa to 27.5 MPa for as long as necessary to be vaporized, or to be cracked, hydrogenated, and vaporized. It is believed that high boiling, high molecular weight hydrocarbons may remain in the mixing zone 1 in the presence of cracked hydrocarbons since the non-acidic metal-containing catalyst promotes the formation of hydrocarbon radical anions upon cracking that react with hydrogen and/or hydrogen sulfide to form stable hydrocarbon products rather than hydrocarbon radical cations that react with other hydrocarbons to form coke or refractory sulfur- and/or nitrogen-containing hydrocarbon compounds. Coke and refractory sulfur- and/or nitrogen-containing hydrocarbon formation is also avoided because the cracked hydrogenated hydrocarbons preferentially exit the mixing zone 1 as a vapor rather remaining in the mixing zone 1 to combine with hydrocarbon anion radicals in the mixing zone 1 to form coke or proto-coke and refractory heteroatomic hydrocarbons.

Although the hydrocracking step of the process produces little coke, coke and metals may accumulate in the mixing zone 1 over time unless removed. A portion of the hydrocarbon-depleted feed residuum and non-acidic metal-containing catalyst may be separated from the mixing zone to remove solids including metals and hydrocarbonaceous solids including coke from the hydrocarbon-depleted feed residuum. The reactor 3 may include a bleed stream outlet 25 for removal of a stream of hydrocarbon-depleted feed residuum and metal-containing catalyst from the mixing zone 1 and the reactor 3. The bleed stream outlet 25 may be operatively connected to the mixing zone 1 of the reactor 3.

A portion of the hydrocarbon-depleted feed residuum may be removed from the mixing zone 1 and the reactor 3 as a bleed stream through the bleed stream outlet 25 while the hydrocracking reaction is proceeding. A portion of the non-acidic metal-containing catalyst may also be removed from the mixing zone 1 as part of the bleed stream. Solids and the catalyst in the bleed stream may be separated from a liquid portion of the hydrocarbon-depleted feed residuum in the bleed stream in a solid-liquid separator 17. The solid-liquid separator 17 may be a filter or a centrifuge. After separation from the solids, the liquid portion of the bleed stream may be recycled back into the mixing zone 1 via a recycle inlet 24 for further processing or may be combined with the hydrocarbon-containing feed and recycled into the mixing zone 1 through the feed inlet 5.

The vapor separated from the mixing zone 1 and the reactor 3 comprises the first hydrocarbon-containing product and hydrocarbons that are gaseous at STP, where most of the hydrocarbons in the vapor are contained in the first hydrocarbon-containing product. The first hydrocarbon-containing product may have a carbon content that contains at least 80%, or at least 90%, or at least 95% of the carbon content of the hydrocarbon-containing feedstock. The hydrocarbons in the vapor that are gaseous at STP may have a carbon content that is at most 10%, or at most 5%, or at most 4%, or at most 3% of the carbon content of the hydrocarbon-containing feedstock.

The first hydrocarbon-containing product is comprised primarily of non-residue and non-asphaltenic hydrocarbon compounds that have a boiling point of 538° C. (1000° F.) or less. The first hydrocarbon-containing product may contain less than 3 wt. %, or at most 2 wt. %, or at most 1 wt. %, or at most 0.5 wt. % of hydrocarbons having a boiling point of greater than 538° C. as determined in accordance with ASTM Method D5307. The first hydrocarbon-containing product may contain VGO hydrocarbons, distillate hydrocarbons, and naphtha hydrocarbons. The first hydrocarbon-containing product may contain, per gram, at least 0.05 grams, or at least 0.1 grams of hydrocarbons having a boiling point from the initial boiling point of the first hydrocarbon-containing product up to 204° C. (400° F.). The first hydrocarbon-containing product may also contain, per gram, at least 0.1 grams, or at least 0.15 grams of hydrocarbons having a boiling point of from 204° C. (400° F.) up to 260° C. (500° F.). The first hydrocarbon-containing product may also contain, per gram, at least 0.25 grams, or at least 0.3 grams, or at least 0.35 grams of hydrocarbons having a boiling point of from 260° C. (500° F.) up to 343° C. (650° F.). The first hydrocarbon-containing product may also contain, per gram, at least 0.3 grams, or at least 0.35 grams, or at least 0.4, or at least 0.45 grams of hydrocarbons having a boiling point of from 343° C. (650° F.) up to 538° C. (1000° F.). The relative amounts of hydrocarbons within each boiling range and the boiling range distribution of the hydrocarbons may be determined in accordance with ASTM Method D5307.

The first hydrocarbon-containing composition may contain sulfur in heteroatomic hydrocarbon compounds, where a significant portion of the sulfur-containing hydrocarbon compounds have a boiling point of less than 343° C. (650° F.). The first hydrocarbon-containing composition may contain, per gram, from 0.001 gram of sulfur up to 0.05 gram of sulfur on an atomic basis. The sulfur content of the first hydrocarbon-containing composition may be determined in accordance with ASTM Method D4294. A significant portion of the sulfur-containing hydrocarbon compounds in the first hydrocarbon-containing composition are contained in the hydrocarbon fractions having a boiling point up to 343° C. (650° F.). In the first hydrocarbon-containing composition at least 40%, or at least 45%, or at least 50%, or at least 60%, or at 65%, or at least 70%, or at least 75%, or at least 80% of the sulfur-containing hydrocarbon compounds, by weight of sulfur as determined in accordance with ASTM Method D4294, may be contained in the hydrocarbon fractions having a boiling point from the initial boiling point of the first hydrocarbon-containing composition up to 343° C. (650° F.) wherein each boiling range and the boiling range distribution of the hydrocarbons may be determined in accordance with ASTM Method D5307. Less than 50%, or less than 45%, or less than 40%, or less than 35%, or less than 30%, or less than 25%, or less than 20% of the sulfur-containing hydrocarbons in the first hydrocarbon-containing composition, by weight of sulfur in the compounds as determined in accordance with ASTM Method D4294, may be contained in hydrocarbon compounds having a boiling point of 343° C. (650° F.) and greater, where the boiling range and boiling range distribution of hydrocarbons boiling at temperatures from 343° C. and above may be determined in accordance with ASTM Method D5307.

A significant portion of the sulfur-containing hydrocarbon compounds in the first hydrocarbon-containing composition may be benzothiophenic compounds. In the first hydrocarbon-containing composition, at least 40 wt. %, or at least 45 wt. %, or at least 50 wt. %, or at least 55 wt. %, or at least 60 wt. % of the sulfur may be contained in benzothiophenic compounds. The amount of sulfur in benzothiophenic compounds in the first hydrocarbon-containing composition relative to the amount of sulfur in all sulfur containing compounds in the first hydrocarbon-containing composition may be determined by sulfur chemiluminescence two dimensional gas chromatography (GCxGC-SCD).

Of the benzothiophenic compounds in the first hydrocarbon-containing composition, a substantial portion may have a boiling point in a range below 343° C. At least 65 wt. %, or at least 70 wt. %, or at least 75 wt. %, or at least 80 wt. %, or at least 85 wt. % of the benzothiophenic compounds, on an atomic sulfur basis as determined by sulfur chemiluminscence two dimensional gas chromatography (GCxGC-SCD), may have a boiling point in a range below 343° C. as determined in accordance with ASTM Method D5307. Benzothiophenic compounds having a boiling point in a range of 343° C. or greater typically are more refractory than benzothiophenic compounds having a lower boiling point.

At least 40 wt. % of the sulfur of the first hydrocarbon-containing product may be contained in hydrocarbon compounds having a carbon number of 17 or less as determined by two-dimensional GC-GC sulfur chemiluminscence, where at least 60 wt. % of the sulfur in the sulfur-containing hydrocarbon compounds having a carbon number of 17 or less may be contained in benzothiophenic compounds as determined by GC-GC sulfur chemiluminscence (GCxGC-SCD).

The first hydrocarbon-containing product also may contain, per gram, at least 0.0005 gram or at least 0.001 gram of nitrogen as determined in accordance with ASTM Method D5762. The first hydrocarbon-containing product may have a relatively low ratio of basic nitrogen compounds to other nitrogen containing compounds therein. The nitrogen-containing hydrocarbon compounds in the first hydrocarbon-containing product may be primarily contained in the hydrocarbon fractions having a boiling point up to 343° C. (650° C.). In the first hydrocarbon-containing product at least 65%, or at least 70%, or at least 75%, or at least 80% of the nitrogen-containing hydrocarbon compounds, by weight of nitrogen in the compounds as determined in accordance with ASTM Method D5762, may be contained in the hydrocarbon fractions having a boiling point from the initial boiling point of the first hydrocarbon-containing product up to 343° C. (650° F.) wherein each boiling range and the boiling range distribution of the hydrocarbons may be determined in accordance with ASTM Method D5307. Less than 35% of the nitrogen-containing hydrocarbons in the first hydrocarbon-containing product, by weight of nitrogen in the compounds as determined in accordance with ASTM Method D5762, may be contained in hydrocarbon compounds having a boiling point of 343° C. (650° F.) or greater, where the boiling range and boiling range distribution of hydrocarbons boiling at temperatures from 343° C. and above may be determined in accordance with ASTM Method D5307.

The first hydrocarbon-containing product may contain significant quantities of aromatic hydrocarbon compounds. The first hydrocarbon-containing product may contain, per gram, at least 0.3 gram, or at least 0.35 gram, or at least 0.4 gram, or at least 0.45 gram, or at least 0.5 gram of aromatic hydrocarbon compounds.

The first hydrocarbon-containing product may contain relatively few polyaromatic hydrocarbon compounds containing three or more aromatic ring structures (e.g. anthracene, phenanthrene) relative to mono-aromatic hydrocarbon compounds and di-aromatic hydrocarbon compounds. The combined mono-aromatic hydrocarbon compounds and di-aromatic hydrocarbon compounds in the first hydrocarbon-containing product may be present in the first hydrocarbon-containing product in a weight ratio relative to the polyaromatic hydrocarbon compounds (containing three or more aromatic ring structures) of at least 1.5:1.0, or at least 2.0:1.0, or at least 2.5:1.0. The relative amounts of mono-, di-, and polyaromatic compounds in the first hydrocarbon-containing product may be determined by flame ionization detection-two dimensional gas chromatography (GCxGC-FID).

The first hydrocarbon-containing product may contain little metal content. The first hydrocarbon-containing product may contain less than 1 wppm, or less than 0.5 wppm of vanadium. The first hydrocarbon-containing product may contain less than 0.5 wppm, or less than 0.3 wppm of nickel. The first hydrocarbon-containing product may contain less than 0.3 wppm, or less than 0.2 wppm of iron.

Hydrotreating the First Hydrocarbon-Containing Product

The first hydrocarbon-containing product is hydrotreated to reduce the sulfur, nitrogen, and olefin content of the first hydrocarbon-containing product and to increase the ratio of mono- and di-aromatic compounds to polyaromatic compounds. The first hydrocarbon-containing product is hydrotreated by contacting the first hydrocarbon-containing product with a catalyst containing a Column 6 (of the Periodic Table) metal or a compound thereof (hereafter the "Column 6 metal catalyst") and hydrogen at a temperature of from 260° C. to 425° C. at a pressure of from 3.4 MPa to 27.5 MPa to produce a second hydrocarbon-containing product.

The first hydrocarbon-containing product is contacted with the Column 6 metal catalyst and hydrogen at the hydrotreating temperature and pressure apart from the mixing zone 1 of the reactor 3, and preferably apart from the reactor 3. The first hydrocarbon-containing product may be hydrotreated by contacting the first hydrocarbon-containing product, the Column 6 metal catalyst, and the hydrogen in a hydrotreating reactor 12. The hydrotreating reactor 12 may be maintained at a temperature of 260° C. to 425° C., preferably from 330° C. to 400° C., and at a pressure of from 3.4 MPa to 27.5 MPa to effect the hydrotreatment of the first hydrocarbon-containing product to produce the second hydrocarbon-containing product. In a preferred embodiment, the first hydrocarbon-containing product is hydrotreated at relatively low pressure, e.g. a pressure of from 3.4 MPa to 6.9 MPa, since a large majority of the sulfur and nitrogen-containing hydrocarbons in the first hydrocarbon-containing product are non-refractory and are contained in the distillate and/or VGO fractions of the first hydrocarbon-containing product rather than in hydrocarbons having a boiling point greater than 538° C. (1000° F.) (as determined in accordance with ASTM Method D5307), so the first hydrocarbon-containing product is relatively easily desulfurized and/or denitrogenated.

The first hydrocarbon-containing product may be contacted with the Column 6 metal catalyst and hydrogen at the hydrotreating temperature and pressure apart from the mixing zone 1 of the reactor 3 by contacting the vapor separated from the reactor 3 with the Column 6 metal catalyst and the hydrogen at the selected hydrotreating temperature and pressure, preferably in the hydrotreating reactor 12. The vapor may be provided from the reactor outlet 11 to the hydrotreating reactor 12. If necessary, or as desired, the vapor may be cooled to a selected temperature, preferably in the hydrotreating temperature range of from 260° C. to 400° C., in a heat exchanger 15 after it exits the reactor 3 prior to being fed to the hydrotreating reactor 12.

Alternatively, the first hydrocarbon-containing product may be separated from hydrogen, hydrocarbon compounds that are gaseous at STP, and hydrogen sulfide that are in the vapor along with the first hydrocarbon-containing product after the vapor is separated from the mixing zone 1 and the reactor 3 and prior to hydrotreating the first hydrocarbon-containing product. The first hydrocarbon-containing product may be separated out of the vapor by condensing the first hydrocarbon-containing product from the vapor. The first hydrocarbon-containing product may be condensed from the vapor by cooling the vapor to a temperature of from 0° C. to 100° C., or from 10° C. to 50° C. and reducing the pressure of the vapor to a pressure of from 0.05 MPa to 1 MPa. The condensed first hydrocarbon-containing product may be collected as a liquid and separated from the gaseous remainder of the vapor. The separated first hydrocarbon-containing product may then be provided to the hydrotreating reactor 12, preferably after heating the separated first hydrocarbon-containing product to the selected hydrotreatment temperature and pressurizing the separated first hydrocarbon-containing product to the selected hydrotreatment pressure.

Hydrogen may be provided for contact with the first hydrocarbon-containing product and the Column 6 metal catalyst to effect the hydrotreating. Provided that the first hydrocarbon-containing product is not separated from the vapor and the vapor is provided for contact with the Column 6 metal catalyst, a portion of the hydrogen that is provided for contact with the first hydrocarbon-containing product and the Column 6 metal catalyst may be contained in the vapor. Hydrogen provided in addition to hydrogen contained in the vapor is derived from a hydrogen source. The hydrogen source may be hydrogen gas obtained from any conventional sources or methods for producing hydrogen gas.

Hydrogen may be provided, as necessary, in addition to hydrogen present in the vapor separated from the reactor 3, to the hydrotreating reactor 12 through a hydrotreating hydrogen inlet line 13. Hydrogen, if necessary, may be provided to the hydrotreating reactor 12 at a ratio relative to the first hydrocarbon-containing product of from 10 $Nm^3/m^3$ to 3570 $Nm^3/m^3$ (56 SCFB to 20000 SCFB). The hydrogen may be maintained at a hydrogen partial pressure of from 3.4 MPa to 27.5 MPa or at a hydrogen partial pressure of from 3.4 MPa to 6.9 MPa in the hydrotreating reactor 12 in the step of converting the first hydrocarbon-containing product to the second hydrocarbon-containing product.

The Column 6 metal catalyst that is contacted with the first hydrocarbon-containing product and hydrogen to catalyze hydrotreatment of the first hydrocarbon-containing product may be any conventional hydrotreating catalyst containing a Column 6 metal or a compound thereof. The Column 6 metal utilized in the hydrotreating catalyst is preferably molybdenum, tungsten, or mixtures thereof, and preferred Column 6 metal compounds utilized in the hydrotreating catalyst include molybdenum oxides, molybdenum sulfides, tungsten oxides, tungsten sulfides, and mixtures thereof.

The Column 6 metal catalyst may also include one or more metals selected from Columns 7-10 of the Periodic Table or compounds thereof. Preferred Columns-7-10 metals that may be utilized in the hydtrotreating catalyst include cobalt, nickel and iron or compounds thereof. The Column 6 metal catalyst may also include a Column 15 element or a compound thereof as a promoter. A preferred Column 15 element or compound for utilization in the hydrotreating catalyst is phosphorous or a phosphorous containing compound.

The Column 6 metal catalyst may also be comprised of a support material on which the Column 6 metal or a compound thereof is dispersed or within which the Column 6 metal or compound thereof is intercalcated. The support material may be a porous refractory oxide or an activated carbon material. The support material may be selected from the group consisting of alumina, silica, silica-alumina, titania, silica-titania, zirconia, silica-zirconia, magnesia, silica-magnesia, carbon, and mixtures thereof. A preferred support material comprises alumina, and preferably contains gamma-alumina.

The supported Column 6 metal catalyst may have a pore structure selected for hydrodesulfurization, hydrodenitrogenation, and/or hydrodearomatization. The supported Column 6 metal catalyst may have a pore size distribution that is unimodal and has a median pore diameter of from 100 angstroms to 350 angstroms, or from 150 angstroms to 250 angstroms, as determined by mercury porisimetry. The supported Column 6 metal catalyst may have a pore size distribution such that at least 90% of the pore volume of the catalyst is contained in pores having a pore diameter of 500 angstroms or less, or 350 angstroms or less, as determined by mercury porisimetry.

The Column 6 metal catalyst may be selected from commercially available hydrotreating catalysts. For example, a suitable commercially available Column 6 metal catalyst is DN-200, a nickel-molybdenum catalyst available from CRI/Criterion, Inc., Houston, Tex., US.

The Column 6 metal catalyst may be sulfided to activate the catalyst. The Column 6 metal catalyst may be sulfided prior to contact with the first hydrocarbon-containing product by passing a sulfiding gas, e.g. hydrogen sulfide, or a sulfur-containing liquid hydrocarbon over the catalyst, preferably at a temperature of from 50° C. to 250° C. The Column 6 metal catalyst may also be sulfided in situ in the hydrotreating reactor 12 by contacting the Column 6 metal catalyst with the vapor separated from the reactor 3, where the first hydrocarbon-containing product is not separated from hydrogen sulfide contained in the vapour after separating the vapor from the reactor 3.

The hydrotreating reactor 12 may be a fixed-bed catalyst reactor and the Column 6 metal catalyst may be a located in a fixed bed in the hydrotreating reactor 12. The first hydrocarbon-containing product and hydrogen may be passed through the fixed Column 6 metal catalyst bed to contact the first hydrocarbon-containing product, the Column 6 metal catalyst, and hydrogen to produce the second hydrocarbon-containing product. The first hydrocarbon-containing product may be passed through the hydrotreating reactor 12 along with the hydrogen over or through the fixed Column 6 catalyst bed at a liquid hourly space velocity (LHSV) of from $0.5\ h^{-1}$ to $10\ h^1$, and preferably at an LHSV of from $1\ h^{-1}$ to $5\ h^1$. Alternatively, the hydrotreating reactor 12 may be a slurry-type reactor, an ebullating-bed reactor, or a plug-flow reactor in which the Column 6 metal catalyst, the first hydrocarbon-containing product and hydrogen flow together through the reactor. The mixture of the first hydrocarbon-containing product and Column 6 metal catalyst may be passed through a slurry-type reactor at a LHSV of from $0.5\ h^{-1}$ to $10\ h^{-1}$, or from $1\ h^{-1}$ to $5\ h^{-1}$.

The second hydrocarbon-containing product is produced by the hydrotreatment of the first hydrocarbon-containing product. The second hydrocarbon-containing product, along with any hydrocarbons that are gaseous at STP (non-condensable hydrocarbons), hydrogen, and hydrogen sulfide, if any, may be provided from the hydrotreating reactor 12 via line 16 to a condenser 14 wherein the second hydrocarbon-containing product may be condensed and separated from non-condensable hydrocarbons, hydrogen, and hydrogen sulfide. In an embodiment of the process of the present invention, the effluent from the hydrotreating reactor 12 may be cooled in one or more heat exchangers (not shown) prior to condensing and separating the second hydrocarbon-containing product in the condenser 14. The second hydrocarbon-containing product may be condensed at a temperature of 85° C. or less, preferably 50° C. or less, and most preferably at 35° C. or less. The second hydrocarbon-containing product may be condensed at a pressure of from 0.101 MPa to 3.4 MPa, and preferably at a pressure of from 0.101 MPa to 1 MPa, most preferably at 0.101 MPa. The condensation may be effected in stages in which the temperature and pressure is decreased in each stage to condense the second hydrocarbon-containing product from the non-condensable gases.

Condensation and separation of the second hydrocarbon-containing product from the effluent from the hydrotreating reactor 12 may also produce a non-condensable gas that may be comprised of non-condensable hydrocarbons having a carbon number from 1 to 4, hydrogen, and hydrogen sulfide. Condensed liquid second hydrocarbon-containing product may be separated from the non-condensable gas through a condenser liquid product outlet 10 and stored in a product receiver 18, and the non-condensable gas may be separated from the condenser 14 through a non-condensable gas outlet 26 and passed through an amine or caustic scrubber 20 to remove hydrogen sulfide and recovered through a gas product outlet 22.

The second hydrocarbon-containing product is comprised primarily of non-residue and non-asphaltenic hydrocarbon compounds that have a boiling point of 538° C. (1000° F.) or less. The second hydrocarbon-containing product may contain less than 3 wt. %, or at most 2 wt. %, or at most 1.5 wt. %, or at most 1 wt. %, or at most 0.5 wt. %, or at most 0.1 wt. % of hydrocarbons having a boiling point of greater than 538° C. as determined in accordance with ASTM Method D5307. The second hydrocarbon-containing product may contain VGO hydrocarbons, distillate hydrocarbons, and naphtha hydrocarbons. The second hydrocarbon-containing product may contain, per gram, at least 0.05 grams, or at least 0.1 grams of hydrocarbons having a boiling point from the initial boiling point of the second hydrocarbon-containing product up to 204° C. (400° F.). The second hydrocarbon-containing product may also contain, per gram, at least 0.1 grams, or at least 0.15 grams of hydrocarbons having a boiling point of from 204° C. (400° F.) up to 260° C. (500° F.). The second hydrocarbon-containing product may also contain, per gram, at least 0.25 grams, or at least 0.3 grams, or at least 0.35 grams of hydrocarbons having a boiling point of from 260° C. (500° F.) up to 343° C. (650° F.). The second hydrocarbon-containing product may also contain, per gram, at least 0.3 grams, or at least 0.35 grams, or at least 0.4, or at least 0.45 grams of hydrocarbons having a boiling point of from 343° C. (650° F.) up to 538° C. (1000° F.). The relative amounts of hydrocarbons within each boiling range and the boiling range distribution of the hydrocarbons may be determined in accordance with ASTM Method D5307.

The second hydrocarbon-containing product contains little sulfur relative to the hydrocarbon-containing feedstock and the first hydrocarbon-containing product. The second hydrocarbon-containing product may contain at most 5%, or at most 2.5%, or at most 1% of the sulfur content, by weight of sulfur, of the hydrocarbon-containing feedstock as determined by ASTM Method D4294. The second hydrocarbon-containing feedstock may contain at most 10%, or at most 5%, or at most 2.5% of the sulfur content of the first hydrocarbon-containing product, by weight of sulfur, as determined by ASTM Method D4294. The second hydrocarbon-containing product may contain at most 2000, or at most 1500, or at most 1000 wppm of sulfur.

The second hydrocarbon-containing product may contain little nitrogen relative to the hydrocarbon-containing feedstock and the first hydrocarbon-containing product. The second hydrocarbon-containing product may contain at most 40%, or at most 35%, or at most 30% of the nitrogen content, by weight of nitrogen, of the hydrocarbon-containing feedstock as determined by ASTM Method D5762. The second hydrocarbon-containing product may contain at most 50%, or at most 40%, or at most 30% of the nitrogen content of the first hydrocarbon-containing product, by weight of nitrogen, as determined by ASTM Method D5762. The second hydrocarbon-containing product may contain at most 1500, or at most 1000, or at most 500 wppm of nitrogen.

Basic nitrogen-containing hydrocarbons may be significantly reduced in the second hydrocarbon-containing product relative to the first hydrocarbon-containing product. Basic nitrogen-containing hydrocarbons may be reduced by at least 70%, or at least 75%, as determined by measuring basicity in accordance with ASTM D2896, in the second hydrocarbon-containing product relative to the first hydrocarbon-containing product.

The second hydrocarbon-containing product may contain relatively few polyaromatic hydrocarbon compounds containing three or more aromatic ring structures (e.g. anthracene, phenanthrene, di-benzothiophene) relative to mono-aromatic hydrocarbon compounds (e.g. benzene, toluene, pyridine) and di-aromatic hydrocarbon compounds (e.g. naphthalene, benzothiophene, bi-phenyl, quinoline). The combined mono-aromatic hydrocarbon compounds and di-aromatic hydrocarbon compounds in the second hydrocarbon-containing product may be present in the second hydrocarbon-containing product in a weight ratio relative to the polyaromatic hydrocarbon compounds (containing three or more aromatic ring structures) of at least 4:1, or at least 5:1, or at least 6:1. The relative amounts of mono-, di-, and polyaromatic compounds in the second hydrocarbon-containing product may be determined by flame ionization detection-two dimensional gas chromatography (GCxGC-FID).

The second hydrocarbon-containing product may contain little metal content. The second hydrocarbon-containing product may contain less than 0.5 wppm, or less than 0.3 wppm of vanadium. The second hydrocarbon-containing product may contain less than 0.3 wppm, or less than 0.2 wppm of nickel. The second hydrocarbon-containing product may contain less than 0.2 wppm of iron.

The process of the present invention may be effected for a substantial period of time on a continuous or semi-continuous basis, in part because the process generates little or no coke. The hydrocarbon-containing feedstock, hydrogen, and hydrogen sulfide may be continuously or intermittently provided to the mixing zone 1 in the reactor 3 for mixing with the non-acidic metal-containing catalyst, preferably where the hydrocarbon-containing feedstock is provided at a rate of at least 400 kg/hr per m$^3$ of the mixture volume as defined above, and mixed in the mixing zone 1 at a temperature of from 375° C.-500° C. and a pressure of from 6.9 MPa-27.5 MPa for a period of at least 40 hours, or at least 100 hours, or at least 250 hours, or at least 500 hours, or at least 750 hours to generate the vapor comprised of the first hydrocarbon-containing product and the hydrocarbon-depleted feed residuum, as described above. The vapor comprised of the first hydrocarbon-containing product may be continuously or intermittently separated from the mixing zone 1 and the reactor 3 and subsequently hydrotreated in the hydrotreating reactor 12 to produce the second hydrocarbon-containing product over substantially all of the time period that the hydrocarbon-containing feedstock, non-acidic metal-containing catalyst, hydrogen, and hydrogen sulfide, if any, are mixed in the mixing zone 1. Fresh hydrocarbon-containing feedstock, hydrogen, and hydrogen sulfide may be blended with the hydrocarbon-depleted feed residuum and non-acidic metal-containing catalyst in the mixing zone 1 over the course of the time period of the reaction as needed. In a preferred embodiment, fresh hydrocarbon-containing feedstock, hydrogen, and hydrogen sulfide are provided continuously to the mixing zone 1 over substantially all of the time period the reaction is effected. Solids may be removed from the mixing zone 1 continuously or intermittently over the time period the process is run by separating a bleed stream 25 of the hydrocarbon-containing feed residuum from the mixing zone 1 and the reactor 3, removing the solids from the bleed stream in the separator 18, and recycling the bleed stream from which the solids have been removed back into the mixing zone 1 via recycle inlet 24 as described above.

To facilitate a better understanding of the present invention, the following examples of certain aspects of some embodiments are given. In no way should the following examples be read to limit, or define, the scope of the invention. The scope of the invention is to be defined by the claims appended hereto.

Example 1

A non-acidic thiometallate catalyst for use in a process of the present invention containing copper, molybdenum, and sulfur was produced, where at least a portion of the catalyst had a structure according to Formula (XV).

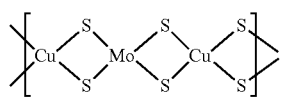

(XV)

1199 grams of CuSO$_4$ was mixed with sufficient deionized water to make a 2 liter solution. Separately, 520.6 grams of (NH$_4$)$_2$MoS$_4$ was mixed in 3.5 liters of deionized water to form an aqueous solution. The CuSO$_4$ solution was heated to 85° C., then the (NH$_4$)$_2$MoS$_4$ solution was transferred into the heated CuSO$_4$ solution through an injection nozzle over a period of 4 hours while stirring the heated solution. After the addition of the (NH$_4$)$_2$MoS$_4$ solution to the heated CuSO$_4$ solution was complete, the mixture was stirred for an additional 4 hours at a temperature of from 85-93° C. Addition of the (NH$_4$)$_2$MoS$_4$ solution to the heated CuSO$_4$ solution and subsequent stirring was conducted under a nitrogen atomosphere. The resulting dark red slurry was then allowed to settle under nitrogen at room temperature overnight. The slurry was then centrifuged at 12000 G to separate the solid thiometallate catalyst as a red sludge from the solution. The solid thiometallate catalyst was washed with deionized water until the conductivity measurements of the wash were under 100 μS at 33° C. The resulting solid thiometallate catalyst material was heated to 55° C. for 5 days under 29 Hg vacuum to dry the catalyst. Just over 409 g of the solid thiometallate catalyst was recovered. Semi-quantitative XRF indicated that the thiometallate catalyst contained, on an element mass % basis, 16.4% Cu, 35.6% Mo, 47.7% S, and <0.1 wt. % Fe and Co. On an atomic basis the thiometallate catalyst composition may be described as Cu$_2$Mo$_3$S$_{12}$. Copper tetrathiomolybdate catalysts having substantially the same composition as the catalyst composition were determined to have an acidity of from 0 to 80 μmol of ammonia desorbed per gram of catalyst as determined by ammonia chemisorption. The thiometallate catalyst was particulate having a bimodal particle size distribution with a mean particle size of the first mode of 3 microns and a mean particle size of the second mode of 110 microns as determined by laser diffractometry using a Mastersizer S made by Malvern Instruments. The BET surface area of the thiometallate catalyst was measured and found to be 113 m$^2$/g. The pore volume of the thiometallate catalyst was found to be 0.157 cm$^3$/g and the median pore diameter of a pore size distribution of the catalyst was found to be 56 angstroms. Determination of the surface area, pore volume, and pore size distribution was effected using techniques consistent with ASTM Method D3663 and ASTM Method D4641. X-ray diffraction and Raman IR spectroscopy confirmed that at least a portion of the thiometallate catalyst had a structure in which copper, sulfur, and molybdenum were arranged as shown in Formula (XV) above.

Example 2

Bitumen from Peace River, Canada was selected as a hydrocarbon-containing feedstock to be processed according to the process of the present invention. The Peace River bitumen was analyzed to determine its composition. The properties of the Peace River bitumen feedstock are set forth in Table 1:

TABLE 1

| Property | Value |
|---|---|
| Hydrogen (wt. %) | 10.1 |
| Carbon (wt. %) | 82 |
| Oxygen (wt. %) | 0.62 |
| Nitrogen (wt. %) | 0.37 |
| Sulfur (wt. %) | 6.69 |
| Sulfur content in compounds having a boiling point of 482° C. or greater relative to total sulfur content (%) | 65 |
| Nickel (wppm) | 70 |
| Vanadium (wppm) | 205 |
| microcarbon residue (wt. %) | 12.5 |
| C5 asphaltenes (wt. %) | 16.2 |

TABLE 1-continued

| Property | Value |
|---|---|
| C7 asphaltenes (wt. %) | 10.9 |
| density (g/ml) (15.6° C.) | 1.01 |
| viscosity at 38° C. (cSt) | 8357 |
| API Gravity (15.6° C.) | 8.5 |
| TAN-E (ASTM D664) (mg KOH/g) | 3.91 |
| Boiling Range Distribution | |
| Initial boiling point-204° C. (400° F.) (wt. %) [Naphtha] | 0 |
| 204° C. (400° F.)-260° C. (500° F.) (wt. %) [Kerosene] | 1 |
| 260° C. (500° F.)-343° C. (650° F.) (wt. %) [Diesel] | 14 |
| 343° C. (650° F.)-538° C. (1000° F.) (wt. %) [VGO] | 38 |
| >538° C. (1000° F.) (wt. %) [Residue] | 47 |

Two samples of Peace River bitumen feedstock were catalytically hydrocracked utilizing the copper tetrathiomolybdate catalyst prepared in Example 1. In each catalytic hydrocracking treatment, the Peace River bitumen feed sample was preheated to approximately 125° C.-150° C. in a 10 gallon feed drum from which the bitumen was fed into a semi-continuous stirred tank reactor with vapor effluent capability, where the reactor had an internal volume capacity of 1000 cm$^3$. The reactor was operated in a continuous mode with respect to the bitumen feedstream and the vapor effluent product, however, the reactor did not include a bleed stream to remove accumulating metals and/or carbonaceous solids. Each feed sample was fed to the reactor as needed to maintain a working volume of feed in the reactor of approximately 500 ml, where the working volume in the reactor was maintained utilizing a $^{137}$Cs gamma Ray level detector coupled to hot oil feed pump variable speed controller. 50 grams of the copper tetrathiomolybdate catalyst prepared in Example 1 was mixed with each respective feed sample in the reactor. Hydrogen was fed to the reactor at a flow rate of 642 to 742 standard liters per hour, and the hydrogen partial pressure in the reactor was maintained at 9.4 MPa (1369 psig) for the first feed sample and at 9.0 MPa (1304 psig) for the second feed sample. Hydrogen sulfide was fed to the reactor at a flow rate of 210-310 standard liters per hour, and the hydrogen sulfide partial pressure in the reactor was maintained at 3.7 MPa (531 psig) for the first feed sample and at 4.1 MPa (597 psig) for the second feed sample. The total pressure in the reactor was maintained at 13.1 MPa while hydrocracking each sample, and the total gas flow rate was maintained at 950 standard liters per hour. The individual bitumen feed sample, hydrogen, hydrogen sulfide and the catalyst were mixed together in the reactor by stirring with a Autoclave Engineers MAG-NADRIVE® impeller, where the impeller was driven at 1200 rpm or higher. The temperature in the reactor was maintained at 428° C. when hydrocracking the first feed sample and at 426° C. when hydrocracking the second feed sample. Vaporized product exited the reactor, where a liquid product was condensed and separated from the vaporized product by passing the vaporized product through a high pressure separator and then through a low pressure separator to separate the liquid "first hydrocarbon-containing product" from non-condensable gases, where the condensation and separation was effected at a temperature of from 80-85° C. to avoid condensation of hydrogen sulfide with the first hydrocarbon-containing product. The reaction was halted when the magnetic coupling of the internal mixer magnet with the external driven magnet was broken due to accumulated solids in the reactor.

The first hydrocarbon-containing product samples were then mixed together and homogenized. The homogenized liquid was split into two aliquots. The first aliquot was tested analytically to determine properties of the homogenized "first hydrocarbon-containing product" samples. Properties of the homogenized "first hydrocarbon-containing product" collected from the hydrocracking of each feed sample are provided in Table 2.

TABLE 2

| | 1$^{st}$ Hydrocarbon-Containing Product |
|---|---|
| Liquid In, kg | 57.07 |
| Liquid Out, kg | 47.46 |
| Liquid Recovery, wt. % | 83.1 |
| Density, g/cm$^3$ (15.6° C.) | 0.9331 |
| API Gravity (15.6° C.) | 20.1 |
| Kinematic viscosity, cSt (20° C.) | 27.48 |
| H/C atomic ratio | 1.58 |
| Carbon content, wt. % | 84.72 |
| Hydrogen content, wt. % | 11.26 |
| Nitrogen content, wt. % | 0.31 |
| Sulfur content, wt. % | 3.45 |
| Sulfur content in hydrocarbon compounds having a boiling point less than 343° C. relative to total sulfur content (%) | 86 |
| Nickel content, ppmw | 0.2 |
| Vanadium content, ppmw | 0.4 |
| Iron content, ppmw | <0.2 |
| BOILING RANGE DISTRIBUTION, Simulated distillation as per ASTM D5307 | |
| Initial BP-204° C. | 8.5 |
| 204° C.-260° C. | 10.5 |
| 260° C.-343° C. | 31.0 |
| 343° C.-538° C. | 48.5 |
| 538° C.+ | 1.5 |

As shown by comparing the properties of the feedstock from Table 1 with the properties of the first hydrocarbon-containing product from Table 2, the hydrocarbon boiling range of the first hydrocarbon-containing product is shifted significantly lower than hydrocarbon boiling range of the feedstock, the viscosity and density of the first hydrocarbon-containing product are significantly lower than that of the feedstock, and the API gravity of the first hydrocarbon-containing product is significantly higher than that of the feedstock. Further, a significant portion of the sulfur in the first hydrocarbon-containing product is contained in compounds that have a boiling point less than 343° C., which are likely easier to hydrodesulfurize than sulfur-containing heteroatoms having a higher boiling point, at least in part due to the generally smaller size of the lower boiling compounds. The yield of liquid hydrocarbons relative to the carbon content of the bitumen feedstock in the first hydrocarbon-containing product is above 80%, and would likely be above 90%, if hydrogen sulfide were removed from the vapor by scrubbing the vapor in an amine separator and the scrubbed vapor was condensed at a temperature of from 5-10° C. or below to capture the lower boiling hydrocarbons that are liquid at STP.

The second aliquot of the homogenized first hydrocarbon-containing product was hydrotreated in a fixed bed reactor separate from the hydrocracking reactor in which the first hydrocarbon-containing product was produced. DN-200, a catalyst formed of nickel and molybdenum supported on an alumina support available from Criterion Inc., was loaded in the catalyst bed of the reactor. Hydrogen and the second aliquot of the homogenized first hydrocarbon-containing product were fed through the fixed bed reactor and contacted with the DN-200 catalyst at a weighted average bed temperature of 371° C. (700° F.). The first hydrocarbon-containing product was fed through the fixed bed reactor at a liquid hourly space velocity of 1 h$^{-1}$. Hydrogen was fed through the fixed bed reactor at a hydrogen/oil ratio of 3000 SCFB. The total pressure in the fixed bed reactor was maintained at 6.9 MPa (1000 psig). The hydrotreated "second hydrocarbon-containing product" was then collected at the outlet of the fixed bed reactor.

The average liquid mass yield of second hydrocarbon-containing product relative to the first hydrocarbon-containing product feed in the hydrotreating step was 96.7 wt. %, and the hydrogen consumption was 700 to 750 SCF per barrel of the first hydrocarbon-containing product feed input into the fixed bed reactor. The properties of the second hydrocarbon-containing product were analyzed, and are shown in Table 3.

TABLE 3

|  | 2nd Hydrocarbon-Containing Product |
|---|---|
| Liquid Recovery, wt. % | 96.7 |
| Density, g/cm$^3$ (15.6° C.) | 0.8879 |
| API Gravity (15.6° C.) | 27.9 |
| Kinematic viscosity, cSt (20° C.) | 13.53 |
| H/C atomic ratio | 1.70 |
| Carbon content, wt. % | 87.23 |
| Hydrogen content, wt. % | 12.44 |
| Nitrogen content, wt. % | 0.11 |
| Sulfur content, wt. % | 0.17 |
| Sulfur content in hydrocarbon compounds having a boiling point less than 343° C. relative to total sulfur content (%) | 48 |
| Nickel content, ppmw | <0.2 |
| Vanadium content, ppmw | 0.3 |
| Iron content, ppmw | <0.2 |
| BOILING RANGE DISTRIBUTION, Simulated distillation as per ASTM D5307 | |
| Initial BP-204° C. | 10.5 |
| 204° C.-260° C. | 14.2 |
| 260° C.-343° C. | 29.6 |
| 343° C.-538° C. | 45.5 |
| 538° C.+ | 0.2 |

The second hydrocarbon-containing product produced by hydrotreating the first hydrocarbon-containing product contains substantially less sulfur and nitrogen than the bitumen feedstock and the first hydrocarbon-containing product. As shown by comparing the sulfur content of the second hydrocarbon-containing product in Table 3 relative to the sulfur content of the bitumen feedstock and the first hydrocarbon-containing product in Tables 1 and 2, respectively, the second hydrocarbon-containing product contains 2.5% of the sulfur of the bitumen feedstock and 4.9% of the sulfur of the first hydrocarbon-containing product, on a weight basis. As shown by comparing the nitrogen content of the second hydrocarbon-containing product in Table 3 relative to the nitrogen content of the bitumen feedstock and the first hydrocarbon-containing product in Tables 1 and 2, respectively, the second hydrocarbon-containing product contains 30% of the nitrogen of the bitumen feedstock and 35.5% of the nitrogen of the first hydrocarbon-containing product, on a weight basis.

The second hydrocarbon-containing product also contains substantially less vanadium and nickel than the bitumen feedstock. Comparing the metals content of the second hydrocarbon-containing product with the metals content of the bitumen feedstock in Tables 3 and 1, respectively, the second hydrocarbon-containing feedstock contains 0.15% of the vanadium content of the bitumen feedstock, by weight; and contains less than 0.28% of the nickel content of the bitumen feedstock, by weight.

The second hydrocarbon-containing product contains a large proportion of the carbon, 80.3%, contained in the bitumen feedstock. The carbon recovery yield is expected to be even greater, e.g at least 90%, when the first hydrocarbon-containing product is separated from non-condensable gases at temperatures from 0° C.-50° C., rather than from 80° C.-85° C., or if the first hydrocarbon-containing product is not separated from the vapor prior to hydrotreatment. Much of the carbon in the second hydrocarbon-containing product is contained in hydrocarbons in lower boiling fractions relative to the bitumen feedstock; and has substantially less sulfur, nitrogen, and metals content than the bitumen feedstock.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A process, comprising:
providing a hydrocarbon-containing feedstock to a mixing zone, where the hydrocarbon-containing feedstock is selected to contain at least 20 wt. % hydrocarbons having a boiling point of greater than 538° C. as determined in accordance with ASTM Method D5307;
providing a metal-containing catalyst comprising a Lewis base to the mixing zone, wherein the metal-containing catalyst comprises a metal or an element of Column 6, 14, or 15 of the Periodic Table or a compound thereof and a metal or an element of Column(s) 3 or 7-15 of the Periodic Table or a compound thereof;
continuously or intermittently providing hydrogen to the mixing zone;
continuously or intermittently providing hydrogen sulfide to the mixing zone, where the hydrogen sulfide is provided to the mixing zone at a mole ratio of hydrogen sulfide to hydrogen provided to the mixing zone of at least 1:10;
blending the hydrogen, hydrogen sulfide, hydrocarbon-containing feedstock, and the catalyst in the mixing zone at a temperature of from 375° C. to 500° C. and at a pressure of from 6.9 MPa to 27.5 MPa to produce:
   a) a vapor comprised of hydrocarbons that are vaporizable at the temperature and the pressure within the mixing zone; and
   b) a hydrocarbon-depleted feed residuum comprising hydrocarbons that are liquid at the temperature and pressure within the mixing zone;
continuously or intermittently separating at least a portion of the vapor from the mixing zone while retaining in the mixing zone at least a portion of the hydrocarbon-depleted feed residuum comprising hydrocarbons that are liquid at the temperature and pressure within the mixing zone, wherein the vapor separated from the mixing zone contains a first hydrocarbon-containing product comprised of one or more hydrocarbon compounds that are liquid at STP; and
apart from the mixing zone, contacting the first hydrocarbon-containing product with hydrogen and a catalyst comprising a Column 6 metal of the Periodic Table or a compound thereof at a temperature of from 260° C. to 425° C. and a pressure of from 3.4 MPa to 27.5 MPa to produce a second hydrocarbon-containing product.

2. The process of claim 1 wherein the catalyst comprising a Column 6 metal further comprises a support material selected from alumina, silica, titania, zirconia, or mixtures thereof.

3. The process of claim 1 wherein the catalyst comprising a Column 6 metal further comprises a Column 7-10 metal of the Periodic Table or compound thereof.

4. The method of claim 1 wherein any metal-containing catalyst provided to the mixing zone has an acidity as measured by ammonia chemisorption of at most 200 μmol ammonia desorbed from the catalyst per gram of catalyst.

5. The process of claim 1 wherein the metal-containing catalyst provided to the mixing zone is comprised of a material comprised of a first metal and a second metal where the first metal comprises a metal selected from the group consisting of Cu, Ni, Co, Fe, Ag, Mn, Zn, Sn, Ru, La, Ce, Pr, Sm, Eu, Yb, Lu, Dy, Pb, Sb, and Bi, where the second metal comprises a metal selected from the group consisting of Mo, W, Sn, and Sb, where the second metal is not the same as the first metal, wherein at least a portion of the material is comprised of the first metal and the second metal has a structure according to formula (I)

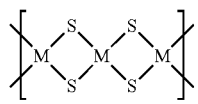

(I)

where M is either the first metal or the second metal, and at least one M is the first metal and at least one M is the second metal.

6. The process of claim 1 wherein the metal-containing catalyst provided to the mixing zone is comprised of a material comprised of a first metal and a second metal where the first metal comprises a metal selected from the group consisting of Cu, Ni, Co, Fe, Ag, Mn, Zn, Sn, Ru, La, Ce, Pr, Sm, Eu, Yb, Lu, Dy, Pb, Sb, and Bi, where the second metal comprises a metal selected from the group consisting of Mo, W, Sn, and Sb, where the second metal is not the same as the first metal, and wherein the material is comprised of at least three linked chain elements, the chain elements comprising a first chain element including the first metal and having a structure according to formula (II) and a second chain element including the second metal and having a structure according to formula (III)

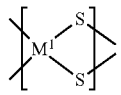

(II)

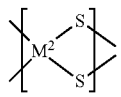

(III)

where $M^1$ is the first metal where $M^2$ is the second metal
   where at least one chain element in the material is a first chain element and at least one chain element in the material is a second chain element, and where chain elements in the material are linked by bonds between the two sulfur atoms of a chain element and the metal of an adjacent chain element.

7. The process of claim 1 wherein the hydrogen sulfide is provided to the mixing zone at a mole ratio of hydrogen sulfide to hydrogen of at least 1:5.

8. The process of claim 1 wherein the hydrocarbon-containing feedstock is continuously provided to the mixing zone, hydrogen is continuously provided to the mixing zone, hydrogen sulfide is continuously provided to the mixing zone, and at least a portion of the vapor is continuously separated from the mixing zone for a period of at least 48 hours.

9. The process of claim 1 wherein the temperature in the mixing zone is selected and controlled to be from 450° C. to 500° C.

10. The process of claim 1 wherein the combined volume of the hydrocarbon-depleted feed residuum, the metal-containing catalyst, and the hydrocarbon-containing feedstock in the mixing zone defines a mixture volume in the mixing zone, and the hydrocarbon-containing feedstock is provided to the mixing zone at a rate selected to be at least 400 kg/hr m³ of the mixture volume in the mixing zone.

11. The process of claim 10 wherein the mixing zone is located in a reactor;
   the reactor has a reactor volume;
   the combined volume of the hydrocarbon-containing feedstock and the metal-containing catalyst initially provided to the mixing zone defines an initial mixture volume, where the initial mixture volume is from 5% to 97% of the reactor volume; and where the mixture volume of the catalyst(s) in the mixing zone, the hydrocarbon-depleted feed residuum, and the hydrocarbon-containing feed is maintained at a level of at least 10% of the initial mixture volume.

12. The process of claim 1 wherein the first hydrocarbon-containing product has a sulfur content and the sulfur content of the second hydrocarbon-containing product is at most 10 wt. % of the sulfur content of the first hydrocarbon-containing product.

13. The process of claim 1 wherein the first hydrocarbon-containing product has a nitrogen content and the nitrogen content of the second hydrocarbon-containing product is at most 50 wt. % of the nitrogen content of the first hydrocarbon-containing product.

14. The process of claim 1 wherein the weight ratio of mono- and di-aromatic compounds to poly-aromatic hydrocarbon compounds in the second hydrocarbon-containing product is at least 4:1.

* * * * *